(12) United States Patent
Hiller et al.

(10) Patent No.: US 11,877,537 B2
(45) Date of Patent: Jan. 23, 2024

(54) PASSIVE SELF-ADJUSTING SEAT ASSEMBLY FOR A LAWN MAINTENANCE VEHICLE

(71) Applicant: MTD PRODUCTS INC, Valley City, OH (US)

(72) Inventors: Adam Hiller, Jeromesville, OH (US); Adam Woodrum, Wakeman, OH (US); Jeff Kucera, Medina, OH (US); Josh Sooy, North Ridgeville, OH (US); Michael Gretchko, Valley City, OH (US)

(73) Assignee: MTD PRODUCTS INC, Valley City, OH (US)

( * ) Notice: Subject to any disclaimer, the term of this patent is extended or adjusted under 35 U.S.C. 154(b) by 697 days.

(21) Appl. No.: 16/782,409

(22) Filed: Feb. 5, 2020

(65) Prior Publication Data

US 2020/0245561 A1  Aug. 6, 2020

Related U.S. Application Data

(60) Provisional application No. 62/907,992, filed on Sep. 30, 2019, provisional application No. 62/801,202, filed on Feb. 5, 2019.

(51) Int. Cl.
*A01D 75/28* (2006.01)
*B60N 2/90* (2018.01)
(Continued)

(52) U.S. Cl.
CPC .......... *A01D 75/285* (2013.01); *A01D 34/64* (2013.01); *A01D 34/82* (2013.01); *B60N 2/39* (2013.01);
(Continued)

(58) Field of Classification Search
CPC .... E05B 5/003; E05B 13/108; E05B 17/2053; B60N 2/39; B60N 2/005; B60N 2/919;
(Continued)

(56) References Cited

U.S. PATENT DOCUMENTS 2,334,193 A * 11/1943 Hedeen ................. B60N 2/146
  296/63
3,466,089 A   9/1969 Stueckle
(Continued)

FOREIGN PATENT DOCUMENTS

DE   102004058503 A1   1/2006
JP     S5897040 U       7/1983

OTHER PUBLICATIONS

International Search Report and the Written Opinion for International Application No. PCT/US2020/016737, International Searching Authority, European Patent Office, dated Jun. 4, 2020, 14 pages.

*Primary Examiner* — Sarah B McPartlin
(74) *Attorney, Agent, or Firm* — Wegman, Hessler, Valore

(57) ABSTRACT

A passive self-adjusting seat assembly for a lawn maintenance vehicle having a frame. The passive self-adjusting seat assembly includes a base, a guide assembly attached to the base, and a platform assembly that is selectively movable or slidable relative to the guide assembly in order to maintain an operator in an upright or substantially vertical orientation as the lawn maintenance vehicle traverses uneven or sloped ground. The seat assembly further including a locking assembly for selectively locking the sliding or movement of the platform assembly relative to the guide assembly.

17 Claims, 26 Drawing Sheets

(51) Int. Cl.
*A01D 34/64* (2006.01)
*A01D 34/82* (2006.01)
*B60N 2/39* (2006.01)
*A01D 101/00* (2006.01)

(52) U.S. Cl.
CPC .......... *B60N 2/919* (2018.02); *A01D 2101/00* (2013.01); *B60N 2002/952* (2018.02)

(58) Field of Classification Search
CPC ............ B60N 2002/952; A01D 75/285; A01D 34/64; A01D 2101/00
See application file for complete search history.

(56) References Cited

U.S. PATENT DOCUMENTS

| | | | | |
|---|---|---|---|---|
| 3,632,076 | A * | 1/1972 | Rogers, Jr. .............. | B60N 2/39 248/371 |
| 3,873,054 | A * | 3/1975 | McKee .................. | B60N 2/143 248/371 |
| 4,500,062 | A * | 2/1985 | Sandvik .................. | B60N 2/39 248/371 |
| 5,160,180 | A * | 11/1992 | Mlynarczyk .............. | E05C 5/02 411/433 |
| 5,857,535 | A * | 1/1999 | Brooks .................. | B60N 2/39 180/41 |
| 6,026,920 | A * | 2/2000 | Obeda .................. | B60G 21/007 180/41 |
| 7,490,903 | B2 * | 2/2009 | Ruppe .................... | B60N 2/39 248/371 |

* cited by examiner

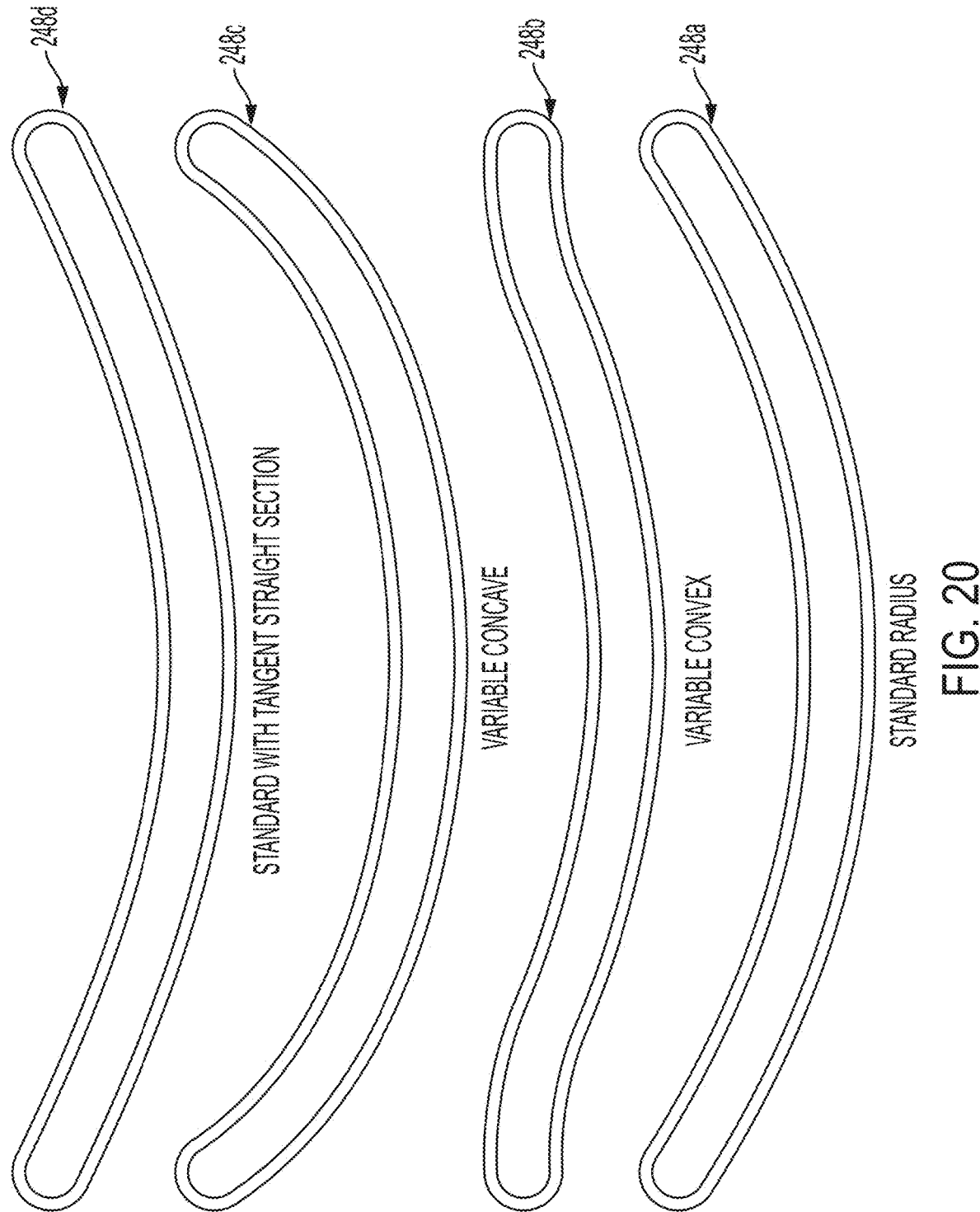

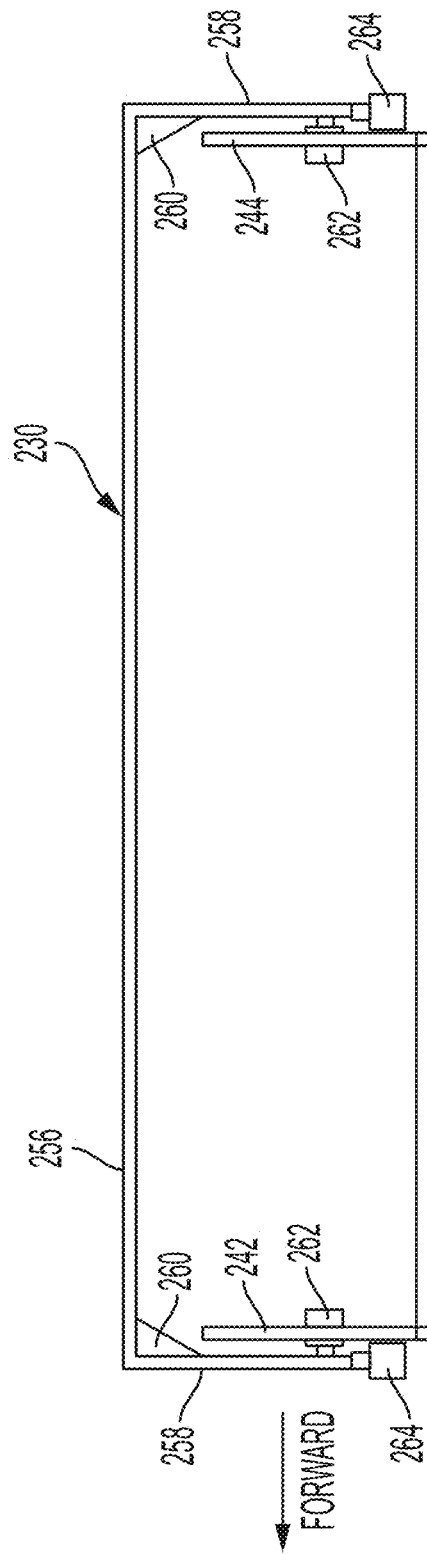
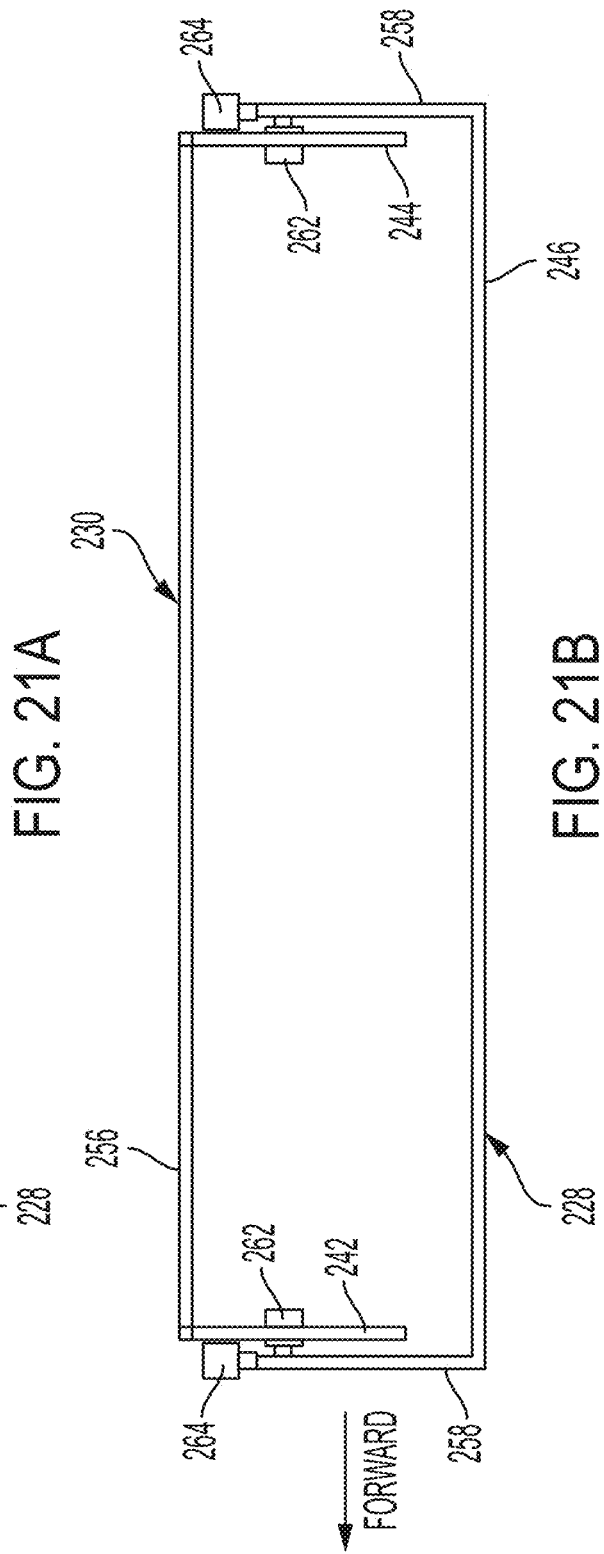
FIG. 21A
FIG. 21B

PASSIVE SELF-ADJUSTING SEAT ASSEMBLY FOR A LAWN MAINTENANCE VEHICLE

CROSS REFERENCE TO RELATED APPLICATION

This application claims priority from U.S. Provisional Application No. 62/801,202, filed Feb. 5, 2019 and U.S. Provisional Application No. 62/907,992 filed Sep. 30, 2019, the entire disclosures of which are hereby incorporated herein by reference.

FIELD OF THE INVENTION

The present invention relates to lawn maintenance vehicles, and more particularly, to a seat assembly for riding lawn mowers or riding lawn tractors.

BACKGROUND OF THE INVENTION

Mowing grass or vegetation on the side of hills, culverts, or other sloped surfaces is generally very difficult on most riding lawn maintenance vehicles such as lawn mowers or lawn tractors. Generally, the operator's seat is bolted or otherwise securely attached to the frame or other structural components of the mower/tractor such that when the operator is mowing grass or other vegetation on a sloped surface, the operator typically has to lean or otherwise adjusts his/her body in the up-slope direction in order to stay somewhat upright or perpendicularly aligned to a horizontal plane. Over an extended time, such contortion of the body often causes pain, stress, and tiredness to the operator. A need therefore exists for a seat assembly for a lawn maintenance vehicle that adjusts to maintain the operator in a substantially upright direction when mowing on a sloped surface.

BRIEF SUMMARY OF THE INVENTION

In one aspect of the present invention, a passive self-adjusting seat assembly for a lawn maintenance vehicle is provided. The passive self-adjusting seat assembly is attached to a frame of a lawn maintenance vehicle. The passive self-adjusting seat assembly includes a base attached to the frame. The base includes a pair of opposing side brackets connected by at least one cross bracket. A guide assembly is connected to the base. The guide assembly includes a front guide plate and a rear guide plate oriented parallel to each other. The front and rear guide plates are operatively connected to each other. Each of the guide plates includes a curved guide slot formed therein. The seat assembly further includes a platform assembly that has a seat support and a seat attached to the seat support. The platform assembly further includes a plurality of longitudinally-oriented guide wheels extending forwardly from a front end of the seat support and rearwardly from a rear end of said seat support wherein each of the guide wheels is received within the guide slot of the front guide plate or the guide slot of the rear guide plate. The platform assembly is selectively slidable relative to the guide assembly in response to the lawn maintenance vehicle traversing uneven or sloped ground to maintain a user in a substantially vertical orientation.

In another aspect of the present invention, a locking assembly for a passive self-adjusting seat assembly is provided. The seat assembly has a platform assembly engaging and selectively movable relative to a guide assembly. The platform assembly includes a support plate and the guide assembly including a guide plate positioned parallel to the support plate. The locking assembly includes a cam bolt attached to said guide plate, said cam bolt having a shank and a cam member. The cam member is positioned at an end of the shank. The shank has a bore formed into the end thereof, forming a shoulder at an end of the bore. The cam member has a cam surface, and the cam surface defines an upper seat and a lower seat. An indexing rod has a first end of the indexing rod located within the bore of the cam bolt. A pin is attached to the first end, and a camming pin extends laterally from the indexing rod. The camming pin is in sliding contact with the cam surface of the cam bolt. The indexing rod is rotatable between a locked position in which the camming pin is received within the lower seat of the cam surface and an unlocked position in which the camming pin is received within the upper seat of the cam surface. The camming pin is slidable along the cam surface between the lower seat and the upper seat of the cam surface. Sliding of the camming pin between the lower seat and the upper seat causes the pin to engage and disengage from the indexing aperture of the support plate.

Advantages of the present invention will become more apparent to those skilled in the art from the following description of the embodiments of the invention which have been shown and described by way of illustration. As will be realized, the invention is capable of other and different embodiments, and its details are capable of modification in various respects.

BRIEF DESCRIPTION OF SEVERAL VIEWS OF THE DRAWINGS

These and other features of the present invention, and their advantages, are illustrated specifically in embodiments of the invention now to be described, by way of example, with reference to the accompanying diagrammatic drawings, in which:

FIG. 20 illustrates various embodiments of a guide slot;

FIG. 21A is an alternative embodiment of the platform assembly and the guide assembly configurations;

FIG. 21B is another alternative embodiment of the platform assembly and the guide assembly configurations.

Figure 1:
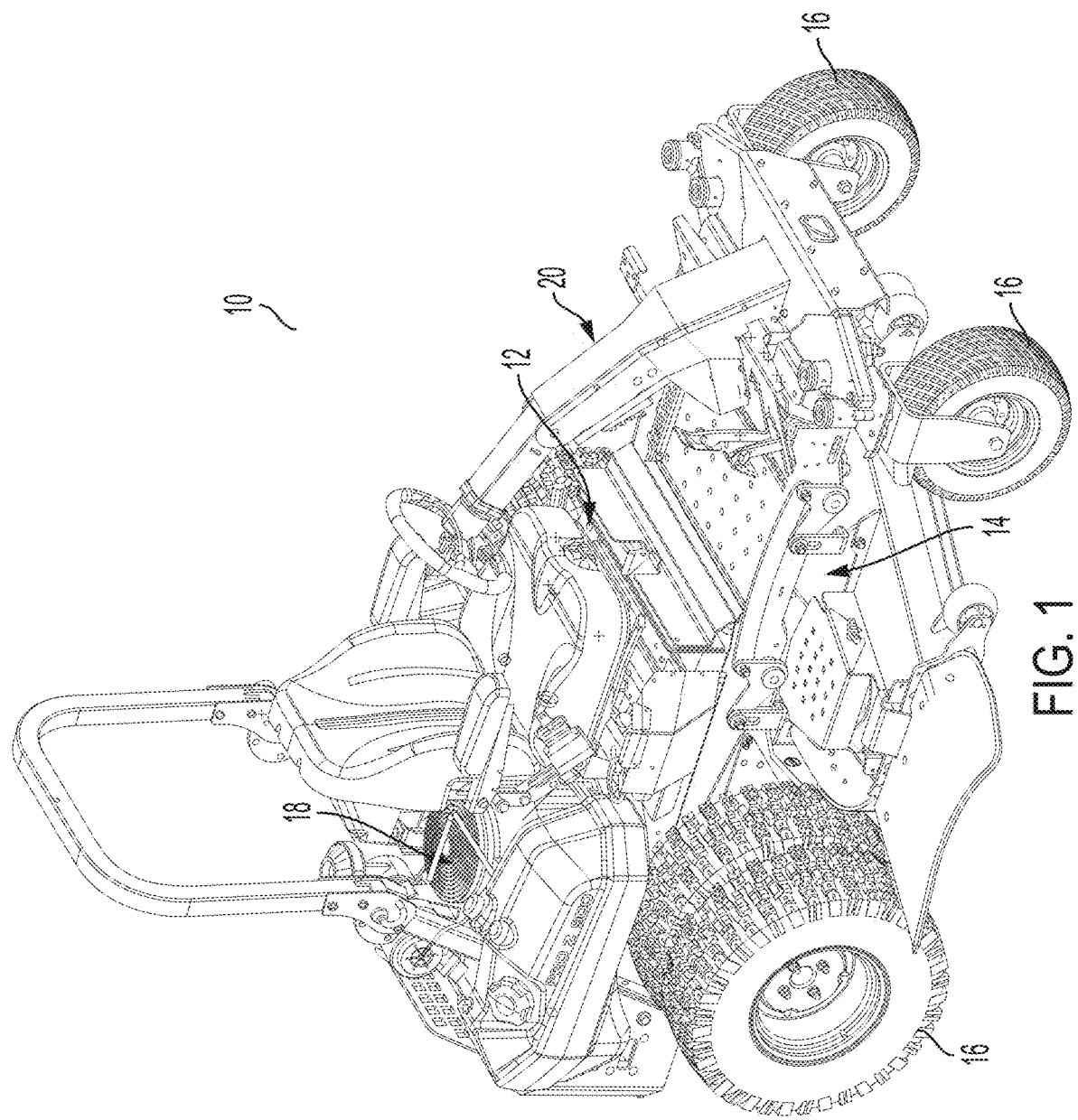
FIG. 1 is an embodiment of a lawn maintenance vehicle having a self-adjusting seat assembly.
Figure 2B:
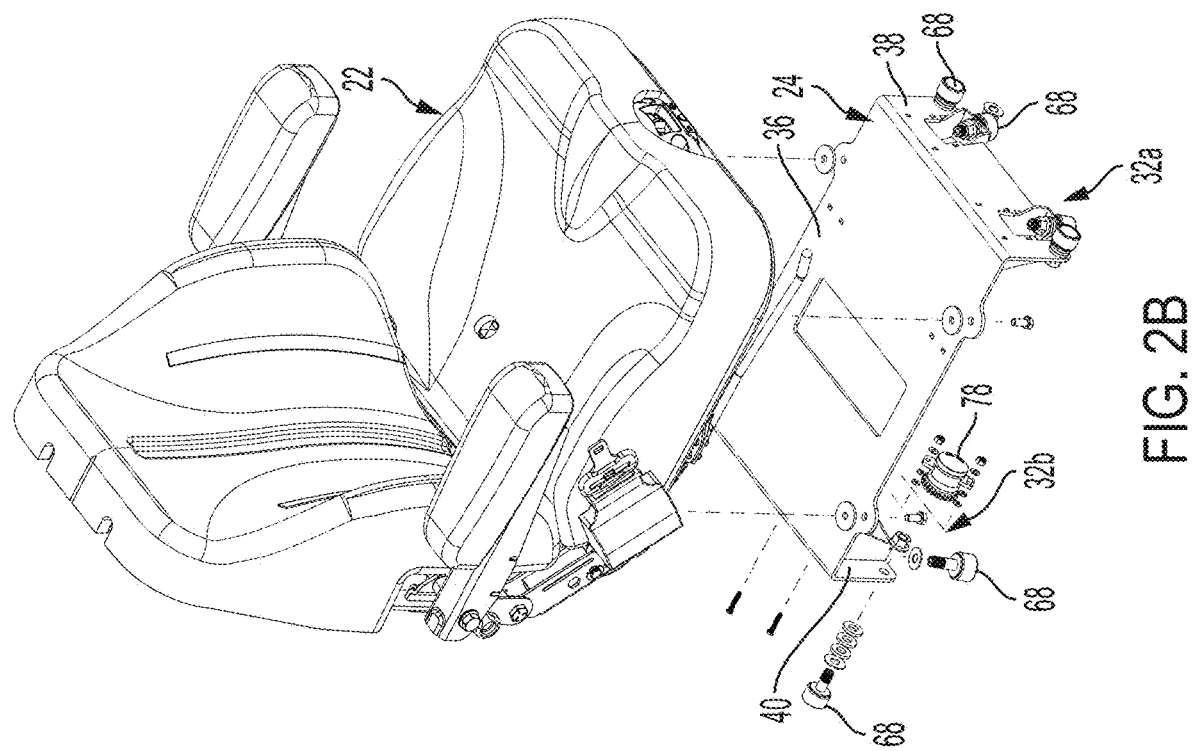
FIG. 2B is an embodiment of a seat and base.
Figure 2A:
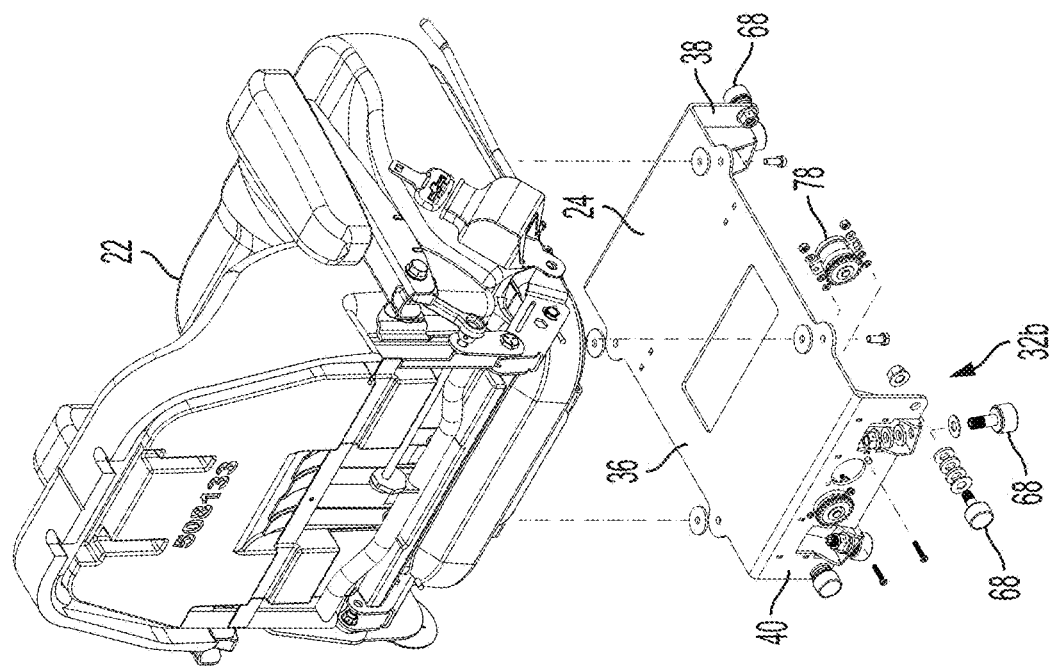
FIG. 2A is an exploded view of a seat and base attachable to the frame of the lawn maintenance vehicle.

It should be noted that all the drawings are diagrammatic and not drawn to scale. Relative dimensions and proportions of parts of these figures have been shown exaggerated or reduced in size for the sake of clarity and convenience in the drawings. The same reference numbers are generally used to refer to corresponding or similar features in the different embodiments. Accordingly, the drawing(s) and description are to be regarded as illustrative in nature and not as restrictive.

DETAILED DESCRIPTION OF THE PREFERRED EMBODIMENT

Referring to FIG. 1, an exemplary embodiment of a lawn maintenance vehicle 10 having a passive self-adjusting seat assembly 12 is shown. In the illustrated embodiment, the vehicle 10 includes a frame 14, a plurality of ground engaging members 16, a power supply 18, and a steering assembly 20. The frame 14 is a base or support structure to which other components of the vehicle 10 are attachable. The plurality of ground engaging members 16 can include pneumatic tires, non-pneumatic tires, caster wheels, rolling tracks, a combination thereof, or the like. The ground engaging members 16 are rotatably and operatively connected to the frame 14 to allow the vehicle 10 to be driven and steered. The power supply 18 is operatively connected to the frame 14 can be formed as an internal combustion engine, at least one electrically-powered motor, or other component that generates power that is delivered to various components of the vehicle 10. The steering assembly 20 is configured to allow an operator to steer the vehicle 10.

The seat assembly 12 is configured to attach a seat to the frame 14. The seat assembly 12 allows the seat to rotate, slide, translate, move, or otherwise adjust relative to the frame 14 in a self-leveling manner. The self-leveling operation of the seat assembly 12 means that adjustment of the seat requires no active input from the user/operator in order to maintain the seat (and operator) in a substantially upright orientation regardless of the slope or uneven ground being traversed by the vehicle 10. Locking and/or unlocking the seat assembly 12 is not considered to be active user input but is instead simply switching the seat assembly 12 between an active or operative mode (in which the seat is movable relative to the frame 14) and an inactive or locked mode (in which the seat is prevented from moving relative to the frame 14). The seat assembly 12 also allows the operator to maintain control of the steering assembly 20 during movement of the seat relative to the frame 14. In some embodiments, the self-adjusting seat assembly 12 also ensures that the operator remain within the protected space provided by a (passive) roll-over protection system (P/ROPS).

In the exemplary embodiment shown in FIGS. 2A-2B and 3A-3B, the seat assembly 12 includes a seat 22, a base 24, a front support assembly 26, a rear support assembly 28, a lock assembly 30, a plurality of roller assemblies 32, and a damping assembly 34. The seat 22 is shown as an L-shaped seat having a pair of opposing arm rests, but it should be understood by one having ordinary skill in the art that the seat 22 can be formed of any structure configured to allow an operator to remain seated during operation of the vehicle 10. The seat 22 is attached to the base 24, wherein the base 24 is formed as a plate that allows the seat 22 to be attached to front and rear assemblies 26, 28.

In the illustrated embodiment, as shown in FIGS. 2A-2B and 3A-3B, the base 24 is formed as a generally inverted U-shaped member. The base 24 includes a central portion 36, a forward leg 38, and a rear leg 40. The forward and rear legs 38, 40 are integrally formed with the central portion 36. The forward leg 38 extends downwardly from the front end of the central portion 36, and the rear leg 40 extends downwardly from the rear end of the central portion 36. The base 24 is formed by a stamping process. In another embodiment, the forward and rear legs 38, 40 are formed separately than the central portion 36 and are subsequently attached to the central portion 36 by way of welding or other similar attaching means. In an embodiment, the forward and rear legs 38, 40 extend substantially perpendicularly from the central portion 36. The forward and rear legs 38, 40 are oriented substantially parallel to each other as they extend downwardly from the central portion 36. It should be understood by one having ordinary skill in the art that some manufacturing tolerances—or the use of the seat assembly 12 during operation—may cause the forward and rear legs 38, 40 to slightly bend, warp, or otherwise become non-parallel to each other or non-perpendicularly aligned with the central portion 36. The seat 22 is attached to the upper surface of the central portion 36 of the base 24.

Figure 3A:
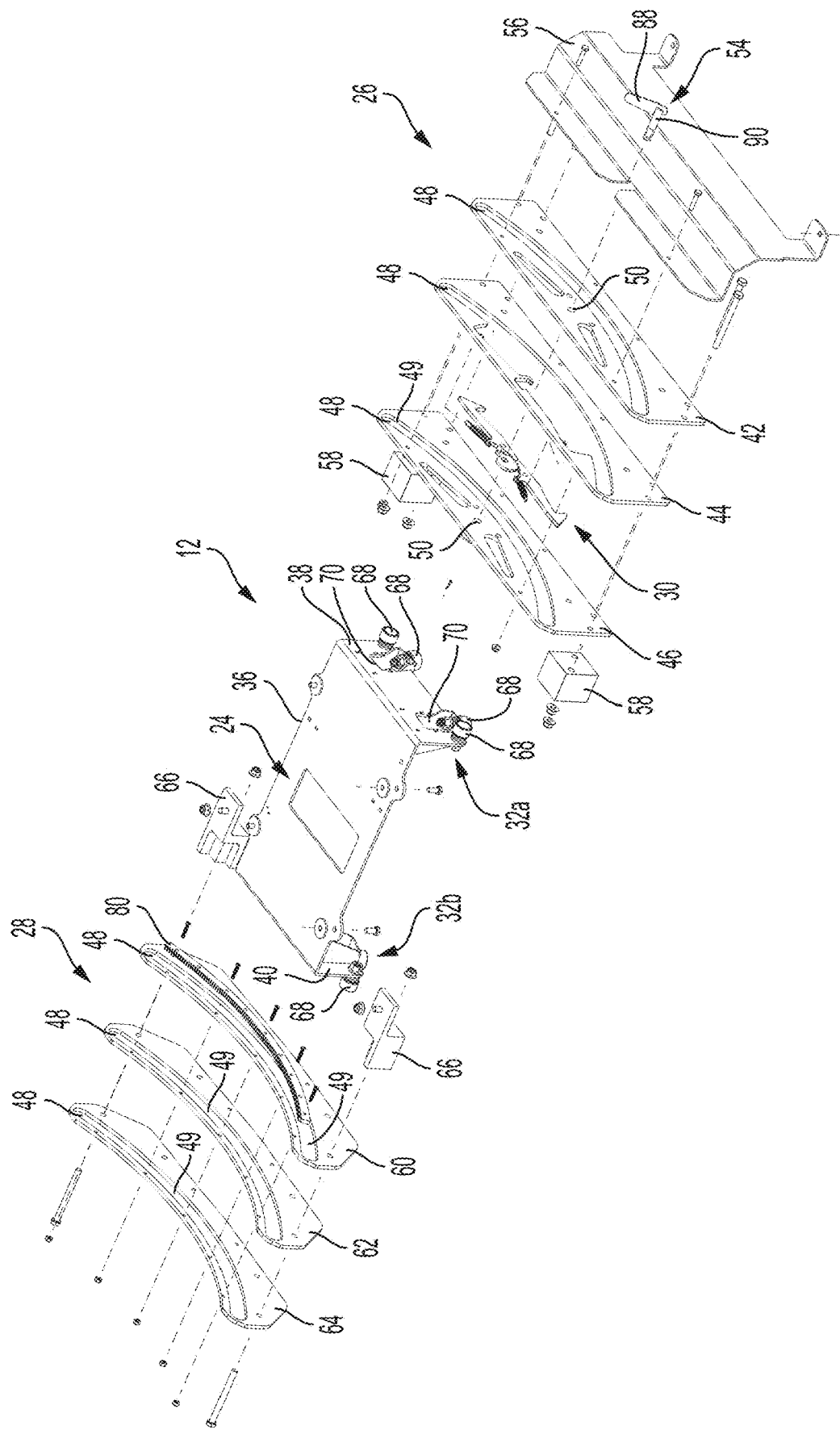
FIG. 3A is front perspective exploded view of the self-adjusting seat assembly.
Figure 3B:
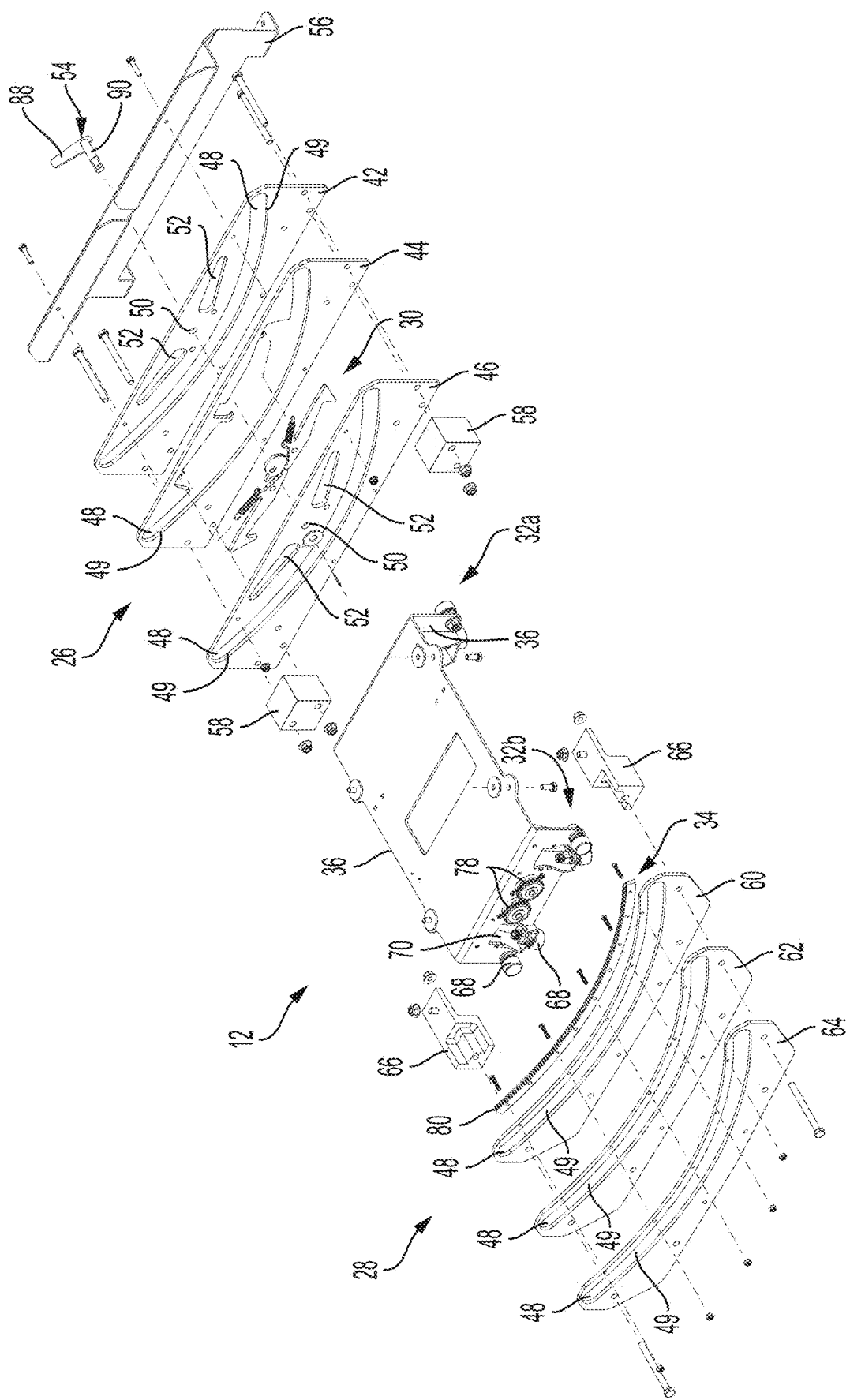
FIG. 3B is a rear perspective exploded view of the self-adjusting seat assembly shown in FIG. 3A.
Figure 4:
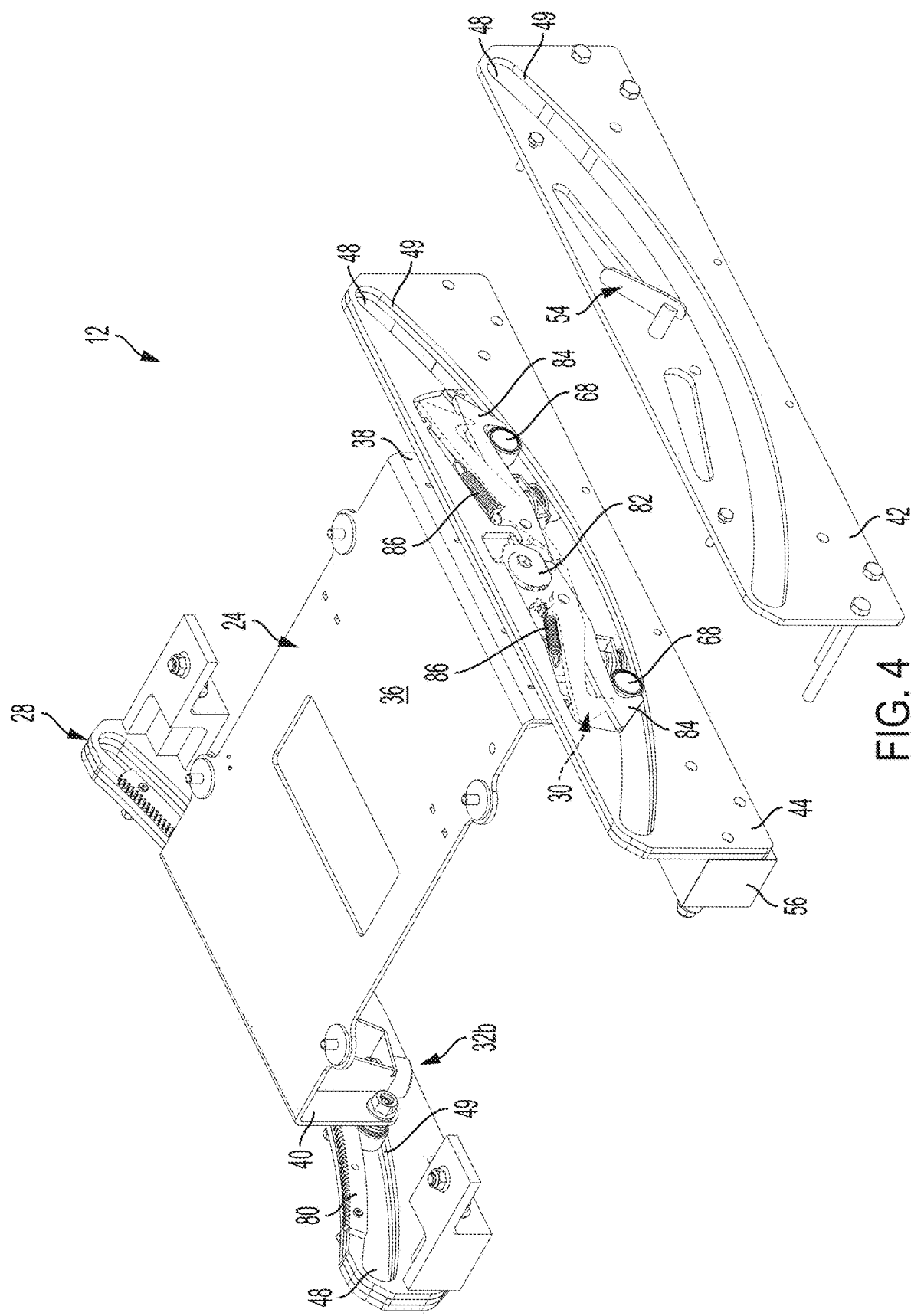
FIG. 4 is a partial exploded view of a locking assembly in a locked position and an unlocked position.

In the illustrated embodiment, the base 24 is slidingly connected to the front and rear support assemblies 26, 28, as shown in FIGS. 3A-3B and 4. The front and rear support assemblies 26 are secured to the frame 14 and provide structural support to the base 24 and seat 22. In an embodiment, the front support assembly 26 includes a first front plate 42, a first middle plate 44, and a first rear plate 46. The first front, middle, and rear plates 42, 44, 46 are secured to each other in a stacked orientation in which the first middle plate 44 is positioned between the first front and rear plates 42, 46 in a sandwiched manner. The first front plate 42 is oriented longitudinally forward (with respect to the front of the vehicle 10) relative to the first rear plate 46. The first front, middle, and rear plates 42, 44, 46 each includes a slot 48 formed through the thickness thereof. The slot 48 formed in each of the first front and rear plates 42, 46 of the front support assembly 26 are continuous, elongated curved or arcuate apertures. In an embodiment, the slot 48 formed in the first middle plate 44 is sized and shaped the same as the first front and rear plates 42, 46. In the illustrated embodiment, the slot 48 formed in the first middle plate 44 is sized and shaped differently than the first front and rear plates 42, 46. When the first plates 42, 44, 46 are stacked and assembled together, the slots 48 of each of the first plates 42, 44, 46 are aligned such that the front support assembly 26 provides an elongated curved recess or aperture having a bearing surfaces 49 for receiving a roller assembly 32.

In the embodiment illustrated in FIGS. 3A-3B, the first front, middle, and rear plates 42, 44, 46 are generally rectangular shaped members. The first plates 42, 44, 46 are oriented such that the width is longer than the height. In another embodiment, each of the front and rear support assemblies 26, 28 is formed of a single plate operatively connected to the base 36 and the frame 14. The front and rear support assemblies 26 can be directly or indirectly connected to the frame 14 and the base 36. In further embodiments, each of the front and rear support assemblies 26, 28 is formed of more than one plate. In yet other embodiments, the first front plate 42 or the first rear plate 46 is integrally formed with the first middle plate 44 such that the front support assembly 26 includes only two first plates. In yet further embodiments, the front and/or rear support assemblies 26, 28 include only a single plate. It should be understood by one skilled in the art that the front and rear support assemblies 26, 28 can be formed of any number of plates. It should also be understood by one having ordinary skill in the art that the front and rear support assemblies 26, 28 can be formed of the same or different number of plates relative to each other. It should further be understood by one having ordinary skill in the art that the configuration of the first front, middle, and rear plates 42, 44, 46 shown in FIGS. 3A-3B can alternatively be positioned rearwardly of the base 24 such that they form the rear support assembly 28.

In the embodiment illustrated in FIGS. 3A-3B and 4, the slot 48 formed through the front and rear support assemblies 26, 28 is sized and shaped substantially the same. In the illustrated embodiment, the bearing surface 49 of each slot 48 has a continuous radius of curvature between opposing ends of the slot 48 in both the front and rear support assemblies 26, 28. In other embodiments, the bearing surface 49 has a central portion having a continuous radius of curvature and opposing end portions extending from the central portion having either a different radius of curvature or are formed as substantially linear portions extending from each end of the arcuate central portion.

As shown in FIGS. 3A-3B, the first front and rear plates 42, 46 further include a first brake aperture 50 and a pair of second brake apertures 52 formed through the thickness thereof. The first brake aperture 50 is shown as being a substantially circular aperture, but it should be understood by one having ordinary skill in the art that the first brake aperture 50 can be formed of any shape sufficient to receive the handle 54 of the lock assembly 30. The first brake aperture 50 is positioned above the center of the slot 48. The pair of second brake apertures 52 are elongated slots positioned above the slot 48 and located laterally adjacent to the first brake aperture 50. The second brake apertures 52 are configured to receive a portion of the lock assembly 30 that is sandwiched between the first front and rear plates 42, 46. In other embodiments, the first front and rear plates 42, 46 do not include the second brake apertures 52. The first front and rear plates 42, 46 also include a plurality of attachment apertures that allows the first front and rear plates 42, 46 to be secure to the first middle plate 44 to form the front support assembly 26.

Figure 6:
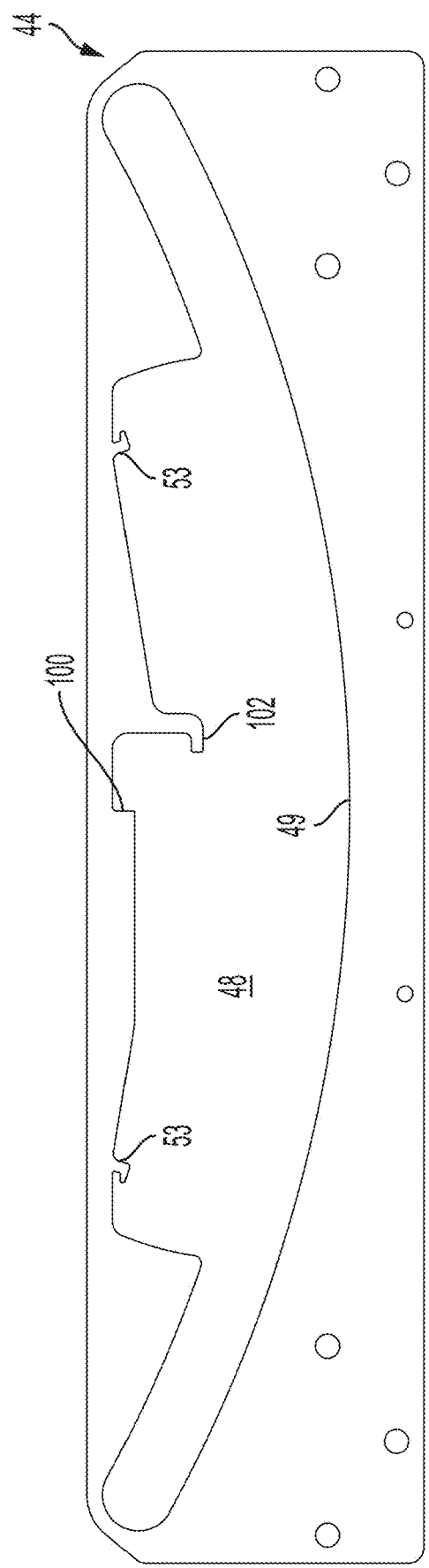
FIG. 6 is a front view of the locking assembly.

In the illustrated embodiment, the slot 48 formed in the first middle plate 44 provides a bearing surface 49 to interface with a roller assembly 32 as well as receive and surround a lock assembly 30, as shown in FIGS. 4 and 6. When the first middle plate 44 is positioned between the first front and rear plates 42, 46, the bearing surface 49 of the first middle plate 44 is aligned with the corresponding bearing surfaces 49 defined by the slots 48 of the first front and rear plates 42, 46. The size and shape of the slot 48 of the first middle plate 44 allows the lock assembly 30 to be positioned between the first front and rear plates 42, 46 in a sandwiched manner when the front support assembly 26 is assembled. The slot 48 formed through the first middle plate 44 includes a pair of hooks 53 that extend into the slot 48. Each hook 53 is configured to engage and receive one end of a corresponding spring 104 of the lock assembly 30. The slot 48 of the first middle plate 44 further defines a first stop surface 100 and a second stop surface 102. The first and second stop surfaces 100, 102 are positioned between the spaced-apart hooks 53. The first and second stop surfaces 100, 102 are configured to limit the rotation of the cam 82 of the lock assembly 30, as will be explained in more detail below.

In the illustrated embodiment, a retaining bracket 56 is positioned adjacent to the forwardly-directed surface of the first front plate 42 of the front support assembly 26. A pair of blocks 58 are positioned adjacent to the rearwardly-directed surface of the first rear plate 46 and adjacent to opposing side edges thereof, as shown in FIGS. 3A-3B and 4. The retaining bracket 56 includes a slot or aperture through which the handle 54 of the lock assembly extends. The retaining bracket 56 is positioned forwardly of the front support assembly 26 to prevent or otherwise significantly reduce the amount of dust, debris, or cut vegetation from entering the slot 48 of the front support assembly 36. The retaining bracket 56 reduces or eliminates debris from interfering with proper engagement between the front support assembly 26 and the corresponding roller assembly 32.

As shown in FIGS. 3A-3B, the rear support assembly 28 includes a second front plate 60, a second middle plate 62, and a second rear plate 64 connected together in a sandwiched manner to provide a support structure for the seat 22 while also providing a slot 48 to interface with the roller assembly 32 of the base 36 to allow the base to move, translate, or slide relative to the frame 14. The second front, middle, and rear plates 60, 62, 64 of the rear support assembly 28 are generally rectangular members. The second front, middle, and rear plates 60, 62, 64 are oriented horizontally such that the longitudinal axis of the second front, middle, and rear plates 60, 62, 64 are oriented substantially perpendicular to the longitudinal axis of the vehicle 10. Each of the second front, middle, and rear plates 60, 62, 64 includes an arcuate slot 48 having a bearing surface 49, described above. In the illustrated embodiment, the slot 48 formed in each of the second front, middle, and rear plates 60, 62, 64 has a continuous radius of curvature between opposing ends of the slot 48. The second front, middle, and rear plates 60, 62, 64 also include a plurality of attachment apertures that allows the second front, middle, and rear plates 60, 62, 64 to be secured together to form the rear support assembly 28.

In the embodiment illustrated in FIGS. 3A-3B, a pair of rear blocks 66 are attached to the rear support assembly 28. At least one pin or bolt extends through each of the plates of the rear support assembly 28 and through one of the rear blocks 66. The rear blocks 66 allow the rear support assembly 28 to be attached to the frame 14. The rear blocks 66 are adjacent to opposing side edges of the rear support assembly 28 and adjacent to each of the opposing ends of the slot 48.

In the illustrated embodiment, a pair of front roller assemblies 32a operatively connect the front end of the base 24 to the front support assembly 26 and a pair of rear roller assemblies 32b operatively connect the rear end of the base 24 to the rear support assembly 28. The front roller assembly 32a includes a plurality of rollers 68, as shown in FIGS. 2, 3A-3B, and 4. In an embodiment, at least one of the rollers 68 is attached directly to the forward leg 38 of the base 24. In some embodiments, at least one roller 68 extends longitudinally forward from the forward leg 38 and at least one roller 68 extends vertically downward from the forward leg 38. In other embodiments, a pair of rollers 68 extend longitudinally forward from the forward leg 38 and a pair of rollers 68 extend vertically downward from the forward leg to engage the front support assembly 26. In another embodiment, at least one of the rollers 68 is attached to a roller bracket 70 that is then attached to the forward leg 38 of the base 24. It should be understood by one having ordinary skill in the art that the front roller assembly 32a can include any number of rollers 68 attached to the forward leg 38 in a direct or indirect manner. In the illustrated embodiment, the front roller assembly 32a includes a pair of rollers 68 attached directly to the forward leg 38 and a pair of rollers 68 indirectly connected to the forward leg 38 by way of separate roller brackets 70. The first pair of rollers 68 are attached directly to the forward leg 38 and are oriented in a substantially horizontal manner such that they extend longitudinally forward from the forwardly-directed face of the forward leg 38. The second pair of rollers 68 are indirectly attached to the forward leg 38 and are oriented in a substantially vertical manner such that they extend vertically downward from the roller brackets 70 attached to the forward leg 38 of the base 24. It should be understood by one having ordinary skill in the art that the front roller assembly 32a can include any number of vertically-oriented rollers 68 in combination with any number of horizontally-oriented rollers 68.

In the embodiment shown in FIGS. 2, 3A-3B, and 4, each of the horizontally-oriented rollers 68 of the front roller assembly 32a are received within the slot 48 of the front support assembly 26 and engage the bearing surface 49 thereof. The forwardly-directed rollers 68 contact the bearing surface 49 of the front support assembly 26, and the downwardly-directed rollers 68 contact the rear surface of the front support assembly 26. The horizontally-oriented rollers 68 contact the bearing surface 49 in a laterally spaced-apart manner such that the rollers 68 are spaced apart within the slot 48 of the front support assembly 26. In the illustrated embodiment, each of the vertically-oriented rollers 68 of the front roller assembly 32a are configured to contact the rear surface of the front support assembly 26, wherein the rear surface of the front support assembly 26 is directed toward the forward leg 38 of the base 24. The horizontally-oriented rollers 68 are configured to allow the base 24 to slide within the slot 48 of the front support assembly 26, and the vertically-oriented rollers 68 are configured to stabilize the base 24 relative to the front support assembly 26. The perpendicular orientation of the pairs of rollers 68 ensure continuous contact between the front roller assembly 32a and the front support assembly 26. The vertically-oriented rollers 68 are configured to prevent or otherwise minimize flexure between the base 24 and the front support assembly 26 so as to maintain the continuous contact between the forwardly-directed rollers 68 and the bearing surface 49.

In the illustrated embodiment, the rear roller assembly 32b includes a plurality of rollers 68, as shown in FIGS. 2, 3A-3B, and 4. Similar to the front roller assembly 32a discussed above, at least one of the rollers 68 is attached directly to the rear leg 40 of the base 24. In another embodiment, at least one of the rollers 68 is attached to a roller bracket 70 that is then attached to the rear leg 40 of the base 24. It should be understood by one having ordinary skill in the art that the rear roller assembly 32b can include any number of rollers 68 attached to the rear leg 40 in a direct or an indirect manner. Embodiments of the rear roller assembly 32b are formed the same as the embodiments of the front roller assembly 32a as discussed above. In the illustrated embodiment, the rear roller assembly 32b includes a pair of rollers 68 attached directly to the rear leg 40 and a pair of rollers 68 each indirectly connected to the rear leg 40 by way of a roller bracket 70. The pair of rollers 68 attached directly to the rear leg 40 are oriented in a substantially horizontal manner, wherein the pair of rollers 68 extend longitudinally rearward from the rear leg 40. Each of the pair of rollers 68 attached to a roller bracket 70 that is then attached to the base 24 are oriented in a substantially vertical manner in which the rollers extend vertically downward from the rear support assembly 28. In an embodiment, the rear roller assembly 32b includes a first horizontally-oriented roller 68 and a first vertically-oriented roller 68 positioned adjacent to one lateral edge of the rear leg 40 as well as a second horizontally-oriented roller 68 and a second vertically-oriented roller 68 positioned adjacent to the opposing lateral edge of the rear leg 40. Each of these pairs of rollers 68 are configured to engage the rear support assembly 28 by way of the bear surface(s) 49 of the slot(s) 48.

In the embodiment shown in FIGS. 2, 3A-3B, and 4, each of the horizontally-oriented rollers 68 of the rear roller assembly 32b are received within the slot 48 of the rear support assembly 28. The horizontally-oriented rollers 68 contact the bearing surface 49 of the rear support assembly 28. The horizontally-oriented rollers 68 contact the bearing surface 49 in a laterally spaced-apart manner such that the rollers 68 are spaced apart within the slot 48 of the rear support assembly 28. In the illustrated embodiment, each of the vertically-oriented rollers 68 of the rear roller assembly 32b are configured to contact the forwardly-directed surface of the rear support assembly 28, wherein the front surface of the rear support assembly 28 is directed toward the rear leg 40 of the base 24. The horizontally-oriented rollers 68 are configured to allow a portion of the base 24 to slide within the slot 48 of the rear support assembly 28, and the vertically-oriented rollers 68 are configured to stabilize the base 24 relative to the rear support assembly 28. The perpendicular orientation of the pairs of rollers 68 ensure consistent contact between the rear roller assembly 32b and the rear support assembly 28. The vertically-oriented rollers 68 are configured to prevent or otherwise minimize flexure between the base 24 and the rear support assembly 28.

Figure 8:
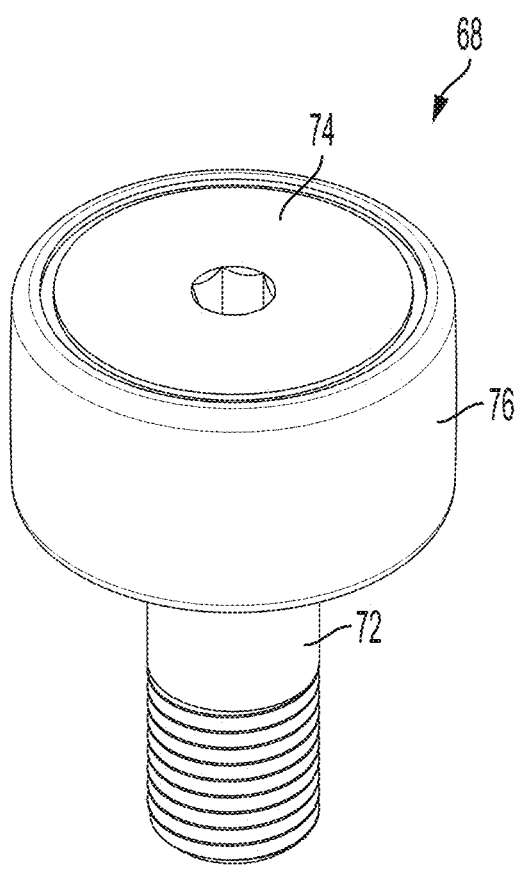
FIG. 8 is an embodiment of a roller.

In an embodiment, each of the rollers 68 includes a pin 72, a bearing 74, and a contact surface 76, as shown in FIGS. 2 and 8. The bearing 74 is fixedly connected to one distal end of the pin 72, thereby allowing the bearing 74 to rotate about the pin 72. The distal end opposite the bearing 74 is threaded to receive a bolt to allow the roller 68 to be removably attachable to a roller bracket 70 or the base 24. The bearing 74 can be any type of bearing that allows the contact surface 76 to rotate about the pin 72. The contact surface 76 is a generally cylindrical member that surrounds the bearing 74. In an embodiment, the contact surface 76 is attached to the outer radial surface of the bearing 74. In another embodiment, the contact surface 76 is a member of the bearing 74 and forms the outer radial movable member of the bearing 74. The contact surface 76 forms the entire outer peripheral surface of the bearing 74. In an embodiment, the contact surface 76 is flat, or linear in the longitudinal direction of the roller 68. In the illustrated embodiment, the contact surface 76 is crowned, or non-linear in the longitudinal direction of the roller 68. The crowned contact surface 76 produces only a line of contact between the roller 68 and the slot 48 or the vertical surface of the front and/or rear support assembly 26, 28 that is immediately adjacent to the base 24. The crowned contact surface 76 reduces or otherwise eliminates unwanted friction or drag that would be caused between a flat/linear contact surface 76 and the bearing surface 49 of the slot 48 if the forward or rear legs 38, 40 of the base 24 are not completely planar or vertical. It should be understood by one having ordinary skill in the art that the shape of the contact surface 76 of the vertically-oriented rollers 68 can be the same or different than the shape of the contact surface 76 of the horizontally-oriented rollers 68.

Figure 9:
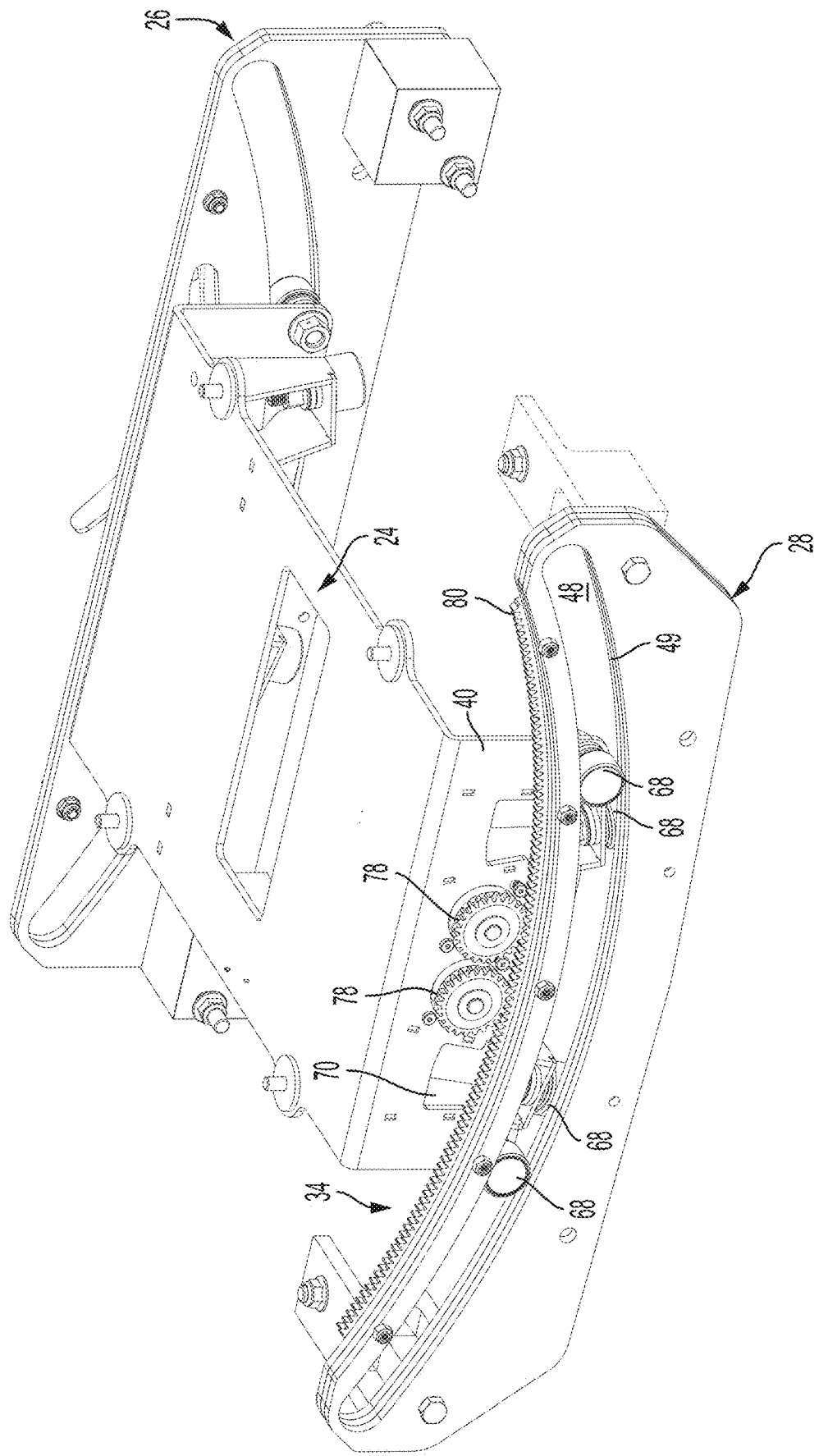
FIG. 9 is an embodiment of a damping assembly.

In the illustrated embodiment, the damping assembly 34 operatively connects the rear leg 40 of the base 24 to the rear support assembly 28, as shown in FIGS. 3B and 9. In another embodiment, the damping assembly 34 operatively connects the forward leg 38 of the base 24 to the front support assembly 26. The damping assembly 34 is configured to dampen sudden movement or rotation of the seat 22 and base 24 relative to the frame 14. The damping assembly 34 provides smooth rotation of the seat 22 and base 24 relative to the frame 14. In the illustrated embodiment, the damping assembly 34 includes a pair of rotatable toothed gears 78 and a curved rack gear 80. It should be understood by one having ordinary skill in the art that the damping assembly 34 can include any number of rotatable toothed gears 78 configured to engage the curved rack gear 80.

As shown in FIGS. 3B and 9, the damping assembly 34 includes a pair of toothed gears 78 that are attached to and rotatable relative to the base 24. The curved rack gear 80 is attached to the rear support assembly 28. Each of the toothed gears 78 are meshingly engaged with the curved rack gear 80. It should be understood by one having ordinary skill in the art that the pair of toothed gears 78 can also be attached to the rear support assembly 28 with the curved rack gear 80 being attached to the base 24.

Each toothed gear 78 includes a damping bearing fixedly attached to a post, bolt or other structure attached the rear leg 40 of the base 24, wherein the toothed gear 78 extends longitudinally rearward from the rear leg 40. The toothed gear 78 further includes a plurality of teeth extending radially outward from the damping bearing. In some embodiments, the toothed gear 78 includes a ring gear having teeth that extend radially outward, wherein the ring gear is attached to the damping bearing. In the illustrated embodiment, the pair of toothed gears 78 are spaced apart from each other but are attached to the rear leg 40 of the base 24 such that both of the toothed gears 78 are in meshing engagement with the curved rack gear 80.

In an embodiment, the damping bearing of each toothed gear 78 provides a one-way damper, wherein the toothed gear 78 can freely rotate in one of the clockwise or counter-clockwise direction but rotation in the opposite direction is damped or otherwise resisted by an internal damper within the damping bearing. Each of the toothed gears 78 has a one-way damping in the opposite direction of the other toothed gear 78. As such, when the first toothed gears 78 freely rotates in the clockwise direction, the clockwise rotation of the second toothed gears 78 is dampened. In the same manner, when the second toothed gear 78 freely rotates in the counter-clockwise direction, the counter-clockwise rotation of the first toothed gear 78 is dampened. This counter-damping of the pair of toothed gears 78 ensures that rotation of the seat 22 relative to the frame 14 is controlled and dampened by the damping assembly 34. In an embodiment, the amount of dampening provided by the toothed gears 78 is pre-determined and fixed. In other embodiments, the amount of dampening provided by the toothed gears 78 is operator-adjustable to allow the operator to control the responsive movement of the seat assembly 12.

The curved rack gear 80 has substantially the same radius of curvature as the slot 48 formed in the rear support assembly 28, as shown in FIGS. 2 and 3B. The arcuate rack gear 80 is an elongated member. The arcuate rack gear 80 is curved in the upward direction when attached to the rear support assembly 28. The curved rack gear 80 is positioned adjacent to the upper edge of the slot 48 of the rear support assembly (vertically opposite the bearing surface 49 of the slot 48). The curved rack gear 80 includes a plurality of gear teeth extending upwardly when installed. The gear teeth of the curved rack gear 80 are configured to mesh with the corresponding gear teeth of each of the toothed gears 78.

In the embodiment illustrated in FIGS. 3A-3B, 4, 5A-5C, and 7 the lock assembly 30 includes an adjustable handle 54, a cam 82, a pair of engaging members 84, and a pair of springs 86. The handle 54 is fixedly attached to the cam 82. The handle 54 is rotatable between an unlocked position in which the engaging members 84 do not engage the horizontally-aligned rollers 68 of the front roller assembly 32a and a locked position in which the engaging members 84 are configured to engage the horizontally-aligned rollers 68 of the front roller assembly 32a. In an embodiment, the handle 54 includes a grip 88 integrally connected to a rod 90. In the illustrated embodiment, the grip 88 is formed as a flat, elongated member. The grip 88 is configured to be grasped by an operator, thereby allowing an operator to rotate the handle 54 between a locked position and an unlocked position. In an embodiment, the rod 90 is formed as an elongated cylindrical member. The handle 54 is integrally connected to a distal end of the rod 90, and the rod 90 extends from the handle 54 in a substantially perpendicular manner. The opposing distal end of the rod 90 is integrally connected to the cam 82.

In an embodiment, the cam 82 is positioned within the slot 48 formed through the thickness of the first middle plate 44, as shown in FIGS. 3A-3B, 4, 5A-5C, and 7. When the front support assembly 26 is assembled, the cam 82 is located between the first front and rear plates 42, 46 in a sandwiched manner. The cam 82 is a substantially flat member includes a body 98 having a curved cam edge 92, a stop edge 94, and an indexing portion 96 that extends outwardly from the body 98. The body 98 is the central portion of the cam 82. The rod 90 of the handle 54 is connected to the body 98 of the cam 82. The rod 90 provides a rotational axis about which the cam 82 rotates. The indexing portion 96 is integrally formed with the body 98 and forms a projection that extends from the body 98 opposite the curved cam edge 92. The curved cam edge 92 forms a generally arcuate or rounded surface configured to contact the engaging members 84 so as to control operation of the engaging members 84. The stop edge 94 is a generally straight surface positioned adjacent to the cam edge 92. The stop edge 94 is configured to contact the engaging member 84 while allowing the engaging members 84 to rotate so as to lock the seat 22 and base 24.

Figure 7:
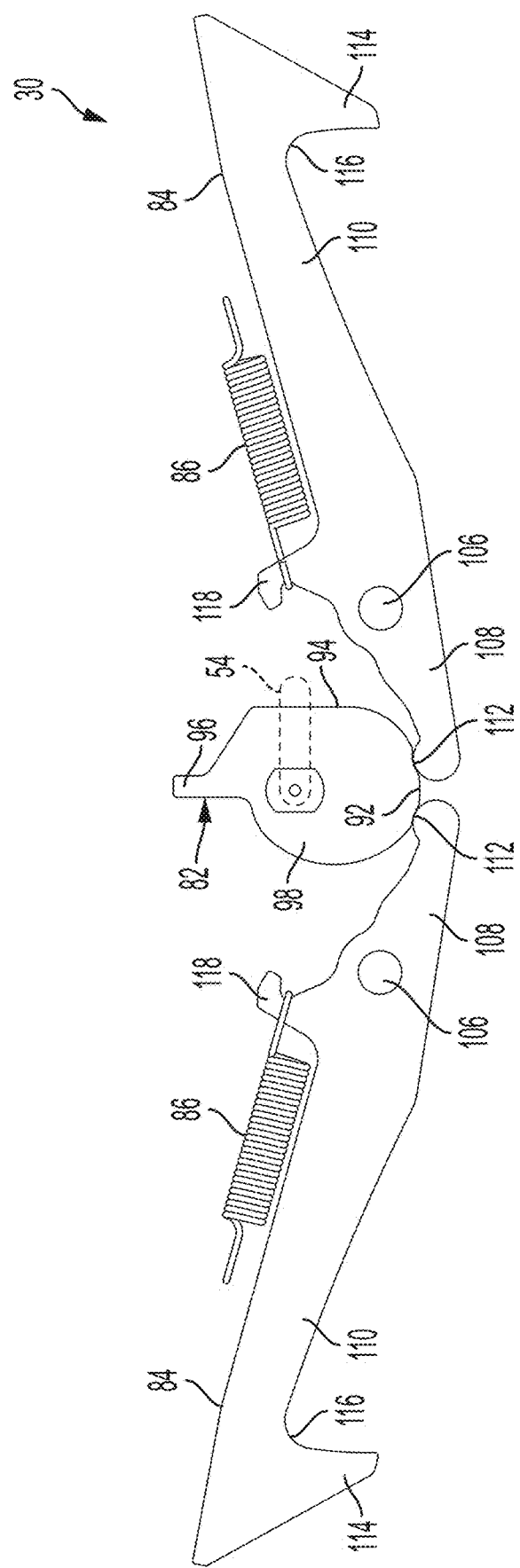
FIG. 7 is a front view of a first middle plate.

As shown in the exemplary embodiment of FIGS. 3A and 7, the lock assembly 30 includes a pair of opposing engaging members 84 that are rotatably connected to the first front and rear plates 42, 46. The engaging members 84 are elongated members, each having a bearing end 108 and an opposing locking end 110. Each engaging member 84 includes a rotation aperture 106 about which the engaging member 84 selectively rotates. The rotation aperture 106 is positioned between the bearing end 108 and the locking end 110, wherein the rotation aperture 106 is located closer to the bearing end 108. The bearing end 108 forms a projection that extends from the rotation aperture 106. The bearing end 108 includes a rounded bearing edge 112 configured to contact and engage the cam 82. The bearing edge 112 is a rounded edge that ensures continuous contact with the cam 82 as the cam 82 and engaging member 84 rotate together. The locking end 110 extends from the rotation aperture 106. A catch 114 is positioned at the distal end of the locking end 110. The catch 114 is formed as a hook or curved member that defines a locking edge 116. The locking edge 116 of the catch 114 is configured to engage and secure a horizontally oriented roller 68 of the front roller assembly 32a so as to selectively lock the seat 22 and base 24 relative to the frame 14 to prevent rotation therebetween. Each engaging member 84 further includes a hook 118 that extends upwardly—in the opposing direction that the catch 114 extends. The hook 118 is configured to engage and receive one end of the spring 86. The hook 118 is positioned between the rotation aperture 106 and the catch 114 of the locking end 110. The hook 118 extends upwardly from the upper edge of the locking end 110.

As shown in FIG. 7, the spring 86 of the locking assembly 30 is an elongated spring. In the illustrated embodiment, the spring 86 is formed as a coil spring. Each opposing end of the spring 86 includes a loop. One of the loops of the spring 86 is removably connected to the hook 118 of an engaging member 84, and the other loops at the opposing end of the spring 86 is removably connected to a corresponding hook 53 of the first middle plate 44. The spring 86 extends generally laterally between the hooks 53, 116. The lateral orientation of the spring 86 biases the locking end 112 of the engaging member 84 downwardly and the bearing end 108 upwardly toward the cam 82.

Figure 5A:
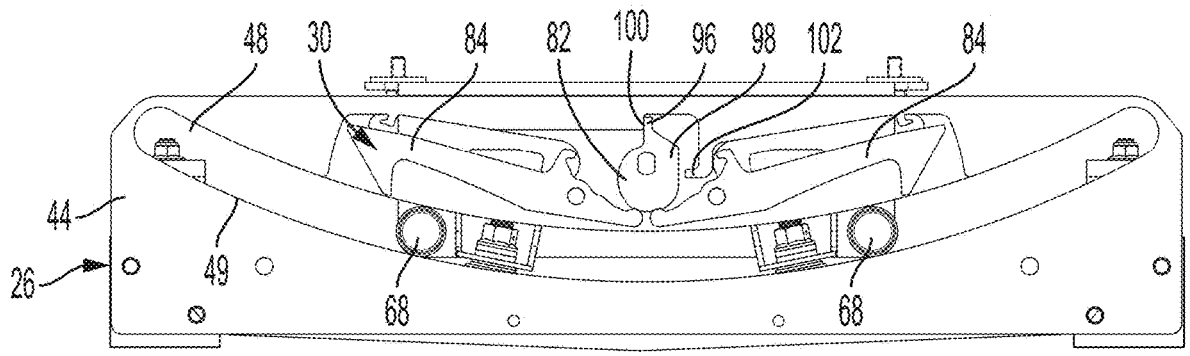
FIG. 5A is a front view of the locking assembly in an unlocked position.
Figure 5B:
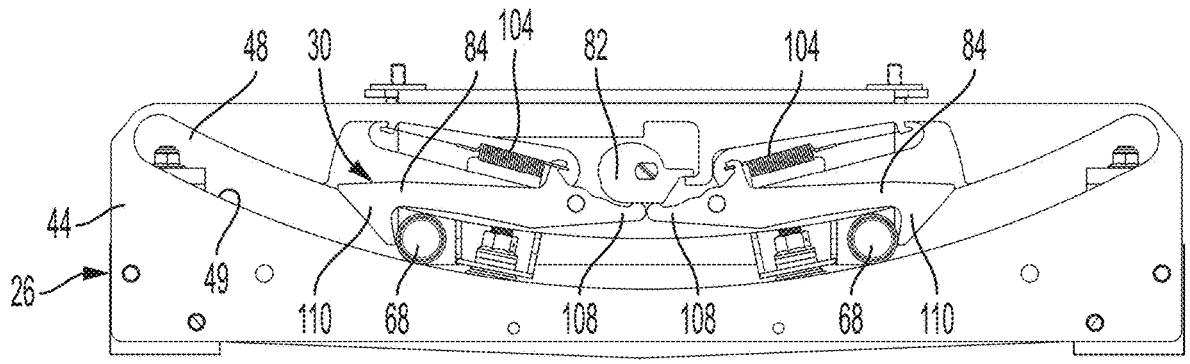
FIG. 5B is a front view of the locking assembly in a locked position.
Figure 5C:
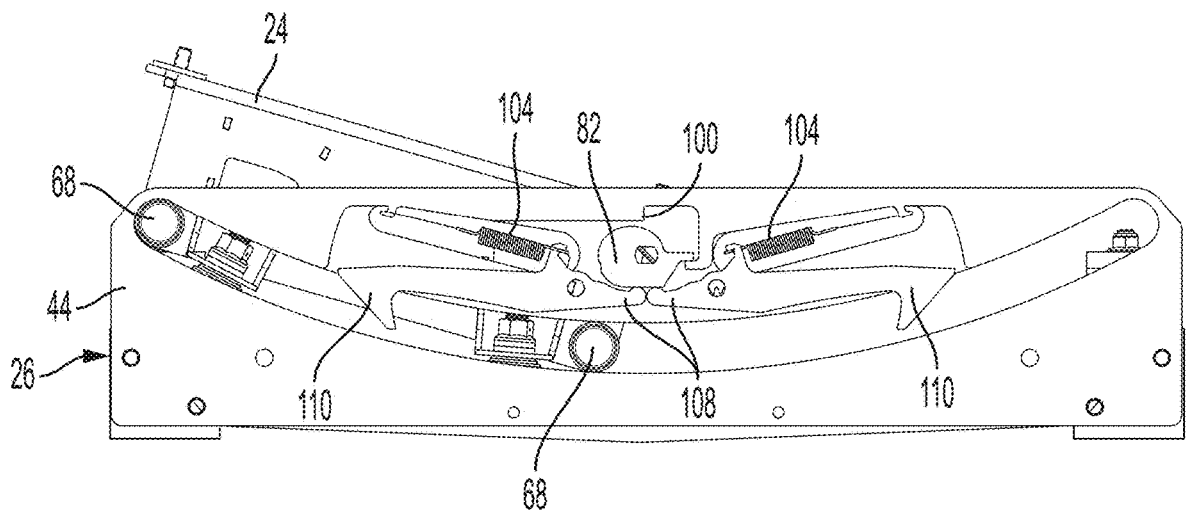
FIG. 5C is a front view of the locking assembly in a lock-set position.

The cam 82 is configured to rotate between a first operative position (FIG. 5A) in which indexing portion 96 contacts the first stop surface 100 of the first middle plate 44 and a second operative position (FIGS. 5B-5C) in which the indexing portion 96 contacts the second stop surface 102 of the first middle plate 44, as shown in FIGS. 5A-5C. When the cam 82 is in the first operative position, the locking assembly 30 is in an unlocked condition. When the cam is in the second operative position, the locking assembly 30 is in a locked condition (FIG. 5B) or bypass condition (FIG. 5C).

When the cam 82 is rotated toward the first operative position, the cam edge 92 engages and pushes the bearing edge 112 of the engaging members 84 to move the engaging members 84 into an unlocked position or a disengaged position. When the cam 82 is rotated toward the second operative position, the cam edge 92 is moved out of contact with the engaging members 84 and the stop edge 94 engages the bearing edge 112 such that the springs 86 cause the catch 114 to rotate downwardly.

In operation, the self-adjusting seat assembly 12 begins in the locked position in which the lock assembly 30 is in the locked condition that to allow an operator to enter and exit the seat 22 of the vehicle 10 without movement of the seat 22 relative to the frame 14. When the seat assembly 12 is locked, the cam 82 is in the second operative position in which the indexing portion 96 of the cam 82 engages the first stop surface 100 of the first middle plate 44, as shown in FIG. 5C. In this position, the stop edge 94 of the cam 82 engages the bearing edge 112 of the bearing end 108 of both engaging members 84. The locking edge 116 of the catch 114 of both engaging members 84 engages the contact surface 76 of a corresponding roller 68. Both horizontally aligned rollers 68 of the front roller assembly 32a are positively engaged by the locking assembly 30 to prevent the seat 22 and base 24 from sliding relative to the front and rear support assemblies 26, 28. When the lock assembly 30 is in the locked condition and the engaging members 84 have engaged the rollers 68, the rollers 68 are prevented from translating within the slots 48.

When the operator wants to allow the seat 22 to rotate relative to the frame 14, the operator rotates the handle 54 such that the cam 82 is rotated to the first operative position, as shown in FIG. 5A. In this position, the lock assembly 30 is in the unlocked condition. The cam edge 92 of the cam 82 engages and pushes the bearing edge 112 of both engaging members 84 so as to rotate the catches 114 away from the rollers 68. This rotation of the engaging members 84 disengages the engaging members 84 from the rollers 68. The rollers 68 are thus allowed to freely translate or move within the slots 48 of the front and rear support assemblies 26, 28. In this condition, as the vehicle 10 traverses uneven or sloped terrain (FIG. 11B), the seat 22 rotates in order to maintain the operator in a substantially vertical orientation.

When the operator wants to lock the seat assembly 12, the operator returns the handle 54 so as to rotate the cam 82 back to the second operative position. Unless the rollers 68 are in a position to be locked, the cam 82 is rotated until the indexing portion 96 contacts the second stop surface 102 of the first middle plate 44, as shown in FIG. 5C, which is the bypass condition of the lock assembly 30. In the bypass condition, one of the rollers 68 is positioned between the catches 114 of the engaging members 84 and the other roller 68 is positioned laterally outward relative to one of the catches 114. As a result, the springs 86 bias the engaging members 84 rotate such that the catches 114 extend into the slot 48 and the bearing edges 112 of the bearing ends 108 of the engaging members 84 contact and engage the stop edge 94 of the cam 82. The springs 86 continually bias the catches 114 of the engaging members 84 downwardly. As the seat 22 returns to the vertical or home position, the roller 68 positioned laterally outward of the adjacent catch 114 pushes the closest engaging member 84 upwardly against the spring 86 bias. Once the seat 22 arrives at the home position, both engaging members 84 engage a corresponding roller 68 and switches the lock assembly 30 to the locked condition (FIG. 5B).

Figure 10:
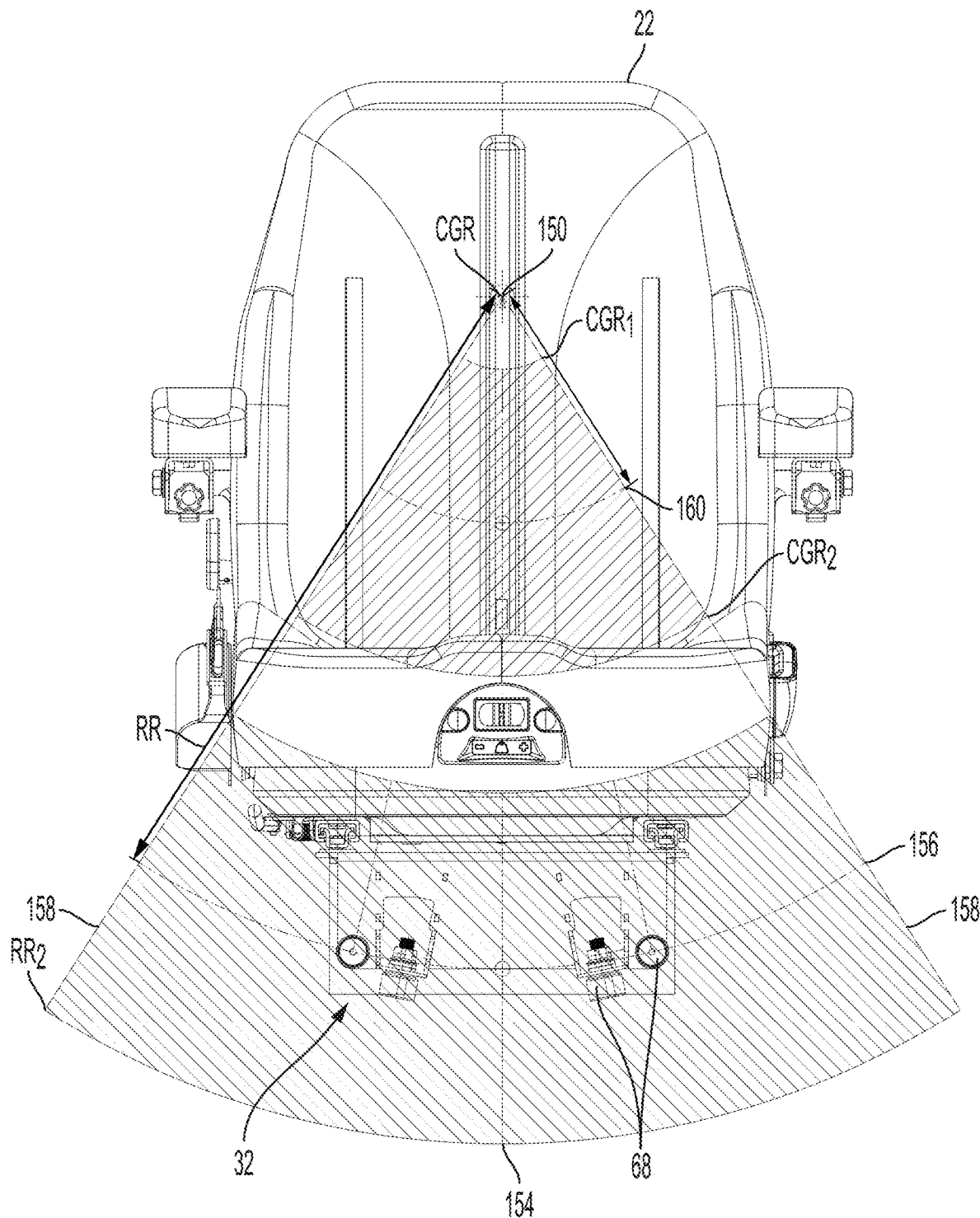
FIG. 10 is a diagram of the center of rotation of the seat assembly relative to the center of gravity of an operator.

FIG. 10 illustrates the clockwise and counter-clockwise rotational limits of the seat assembly 12. The vertical centerline 154 of the seat assembly 12 defines the locked position or home position of the seat 22. The roller assemblies 32 translate or move within the slots 48 of the front and rear support assemblies 26, 28 about the centerline 154. The curved slots 48 define a travel arc 156, and the opposing ends of the slot 48 define the travel limit 158 of the rollers 68 in each direction relative to the centerline 154. The center of rotation 150 of the travel arc 156 is located along the centerline 154. The center of gravity of the user 152 is typically going to be positioned along the centerline 154 when the seat 22 is in the home position. As the seat 22 rotates in response to the vehicle 10 traversing uneven or sloped terrain (FIG. 11B), the center of gravity 152 of the user travels along the operator arc 160. In the illustrated embodiment, the center of rotation 150 of the seat assembly 12 is positioned above the center of gravity of the user 152.

The roller radius RR, as shown in FIG. 10, is the distance between the center of rotation 150 and the travel arc 156.

The center of gravity radius CGR is the distance between the center of rotation 150 of the seat assembly 12 and the center of gravity 152 of the user. In an embodiment, the distance of the roller radius RR should be located between 1.3-11.5 times greater than the center of gravity radius CGR. In the illustrated embodiment, the roller radius RR should be located between an inner roller radius RR1 and an outer roller radius RR2 relative to the operator arc 160. When the roller radius RR is located between the inner roller radius RR1 and the outer roller radius RR2, the operator is able to comfortably maintain continuous control of the steering assembly 20 during rotation of the seat assembly 12.

As shown in FIG. 10, when in the home position, the center of gravity radius CGR should be located between an inner center of gravity radius CGR1 and an outer center of gravity radius CGR2. The inner center of gravity radius CGR1 is about 15% of the distance of the roller radius RR, and the outer center of gravity radius CGR2 is about 45% of the distance of the roller radius RR.

Figure 11A:
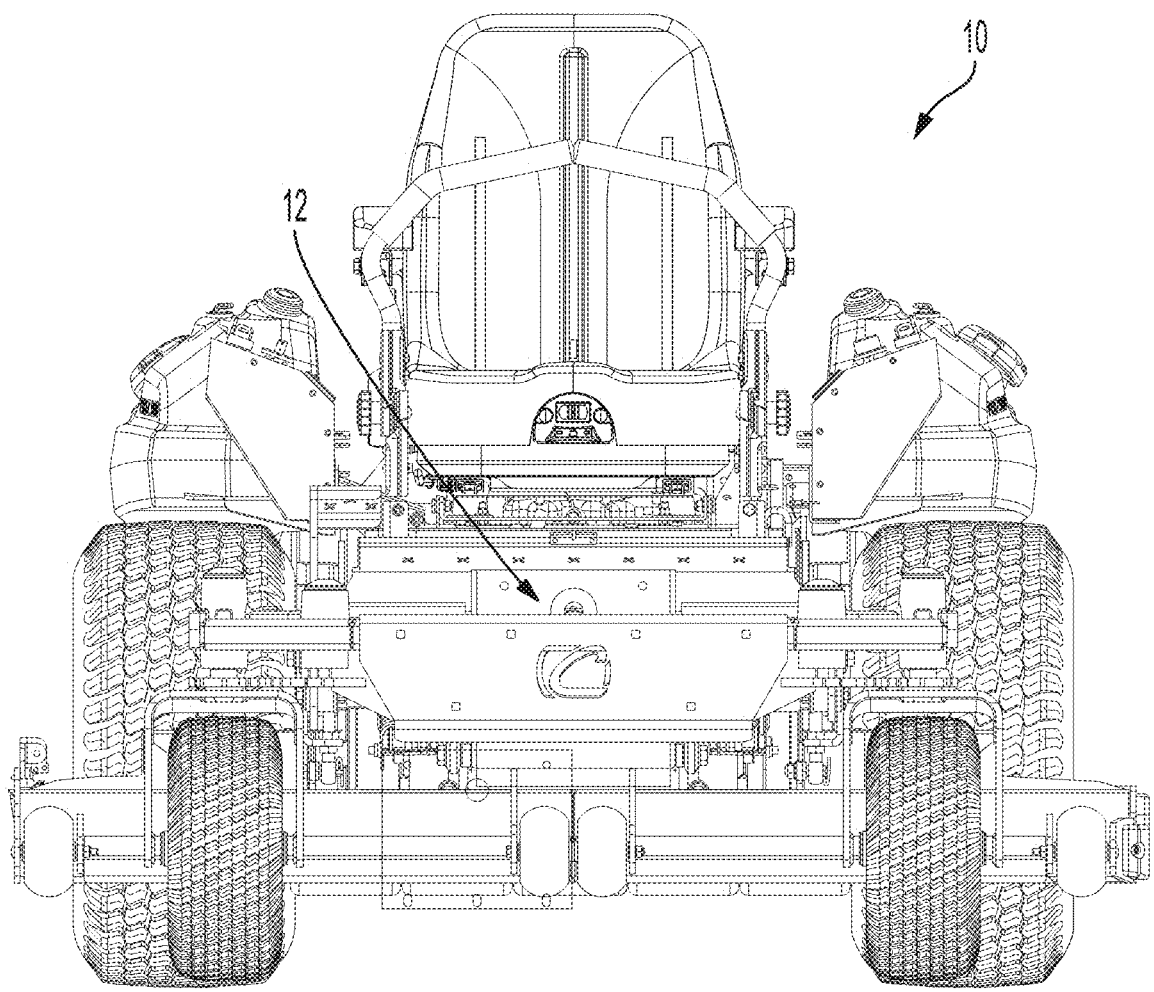
FIG. 11A is a lawn maintenance vehicle on flat terrain.
Figure 11B:
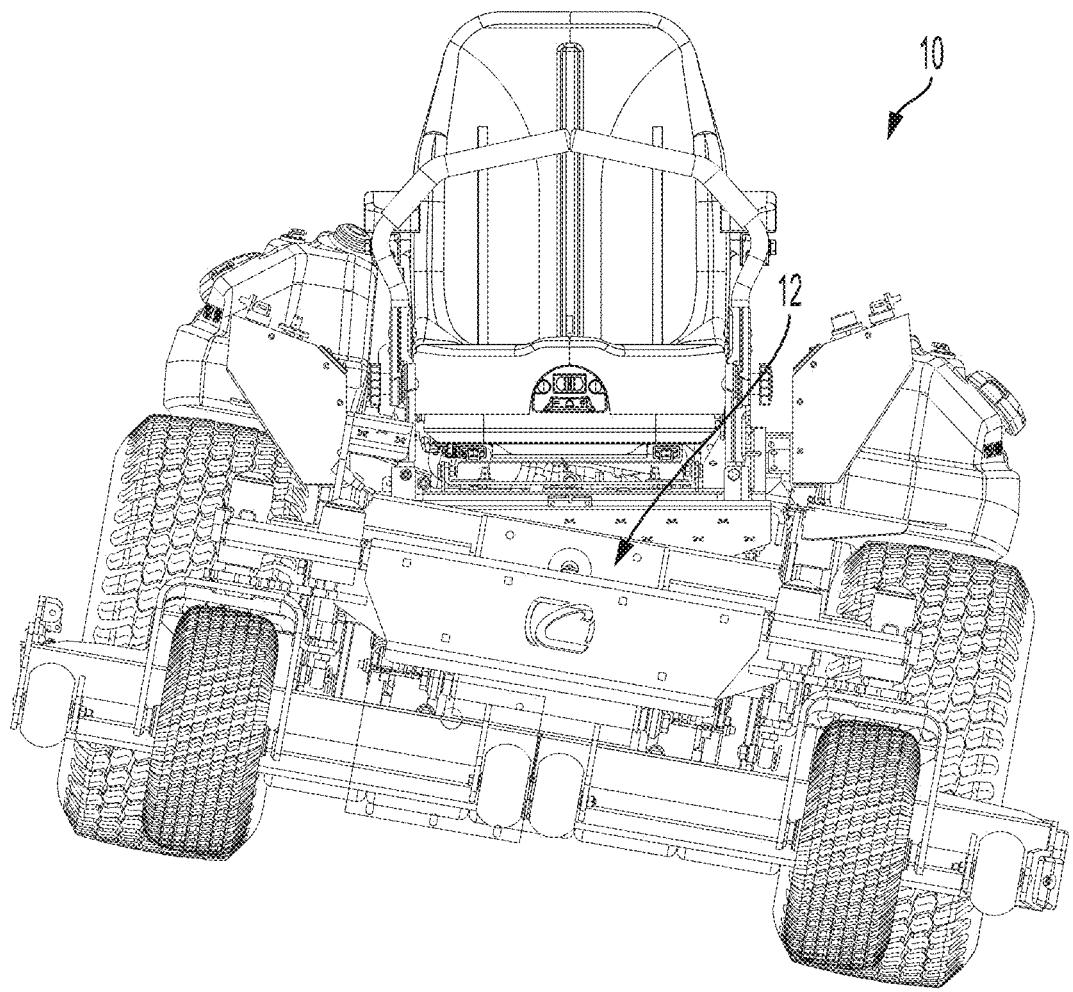
FIG. 11B is a lawn maintenance vehicle on sloped terrain.

FIGS. 11A-11B illustrate an embodiment of the vehicle 10 having the self-adjusting seat assembly 12 that allows the seat 22 to rotate relative to the frame 14. FIG. 11A shows the seat 22 in the home position. When in the home position, the seat 22 is oriented in a substantially vertical orientation. In the home position, the lock assembly 30 can be in either the locked condition or the bypass condition. In the bypass condition, the seat 22 is free to rotate relative to the frame 14 until the seat 22 returns to the home position, at which point the lock assembly 30 engages a roller assembly 32, thereby preventing the seat 22 from rotating. When the lock assembly 30 is in the unlocked condition, the seat 22 is able to rotate in response to the vehicle 10 traversing uneven or sloped terrain, as shown in FIG. 11B. As the vehicle 10 tilts away from a vertical orientation, the seat 22 of the seat assembly 12 rotates relative to the frame 14 in order to maintain the seat 22 (and user) in a substantially vertical orientation. Maintaining the operator in a substantially vertical orientation reduces the stresses on the operator as well as allow the operator to comfortably maintain control of the steering assembly 20.

In an embodiment in which the steering assembly 20 is a steering wheel (not shown), the center of rotation 150 (FIG. 10) of the seat assembly 12 is generally aligned longitudinally with the center of rotation of the steering wheel.

Figure 12:
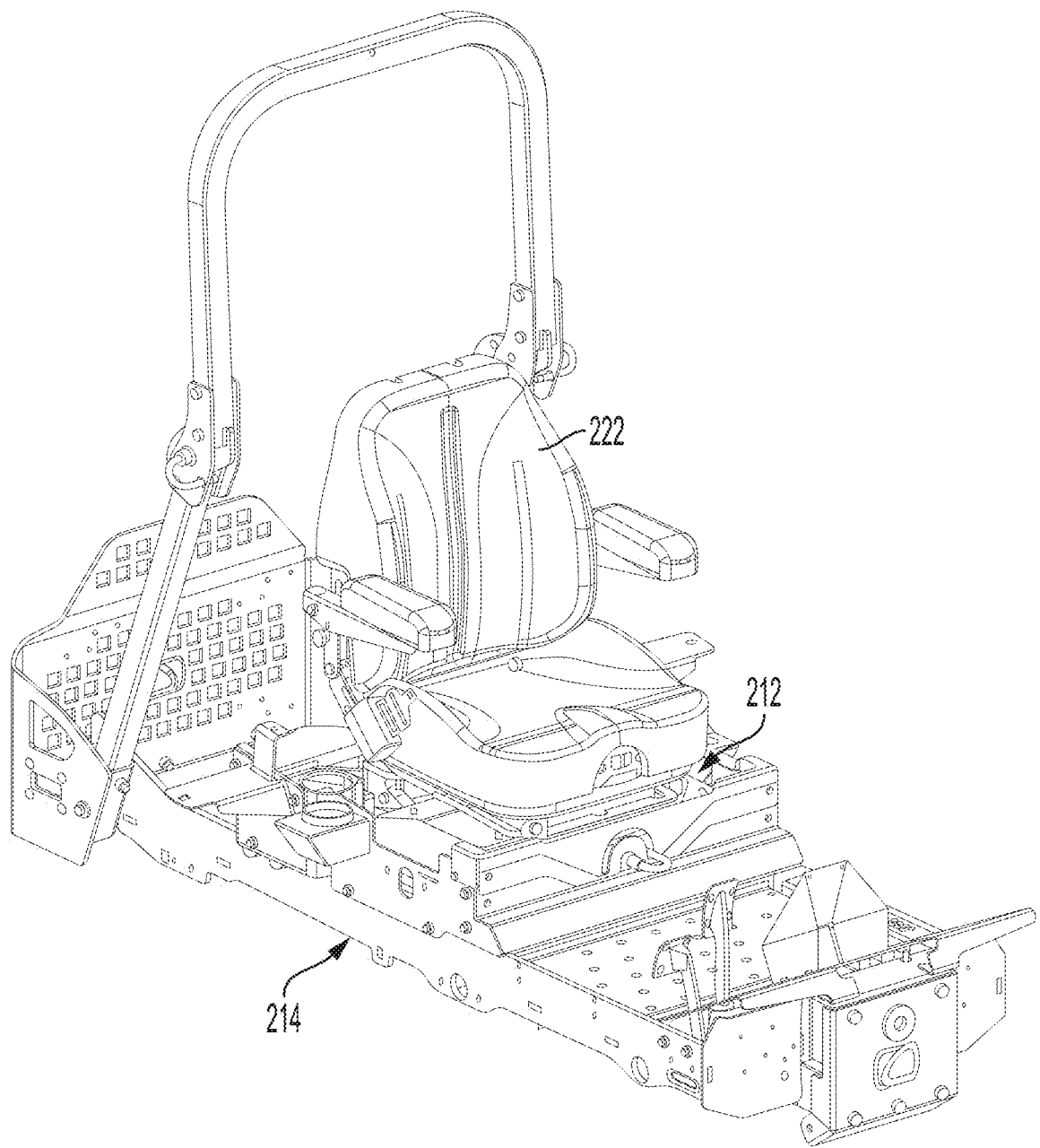
FIG. 12 is another embodiment of a passive self-adjusting seat assembly attached to the frame of a riding lawn maintenance vehicle.

Referring to FIG. 12, another exemplary embodiment of a self-adjusting seat assembly 212 for a riding lawn maintenance vehicle is shown. The lawn maintenance vehicle includes a frame 214, and the self-adjusting seat assembly 212 is attached to the frame 214. The seat assembly 212 is configured to allow the seat 222 of the seat assembly 212 to rotate relative to the frame 214 when the lawn maintenance vehicle is traversing sloped, inclined, or otherwise uneven ground. The seat assembly 212 is switchable between a locked mode and an unlocked mode. When the seat assembly 212 is in the locked mode, the self-leveling operation is prevented from allowing the seat 222 of the seat assembly 212 to be adjusted relative to the frame 214. When the seat assembly 212 is in the unlocked mode, the self-leveling operation allows the seat 222 to be movable relative to the frame 214 to maintain the operator in a substantially upright orientation.

Figure 13:
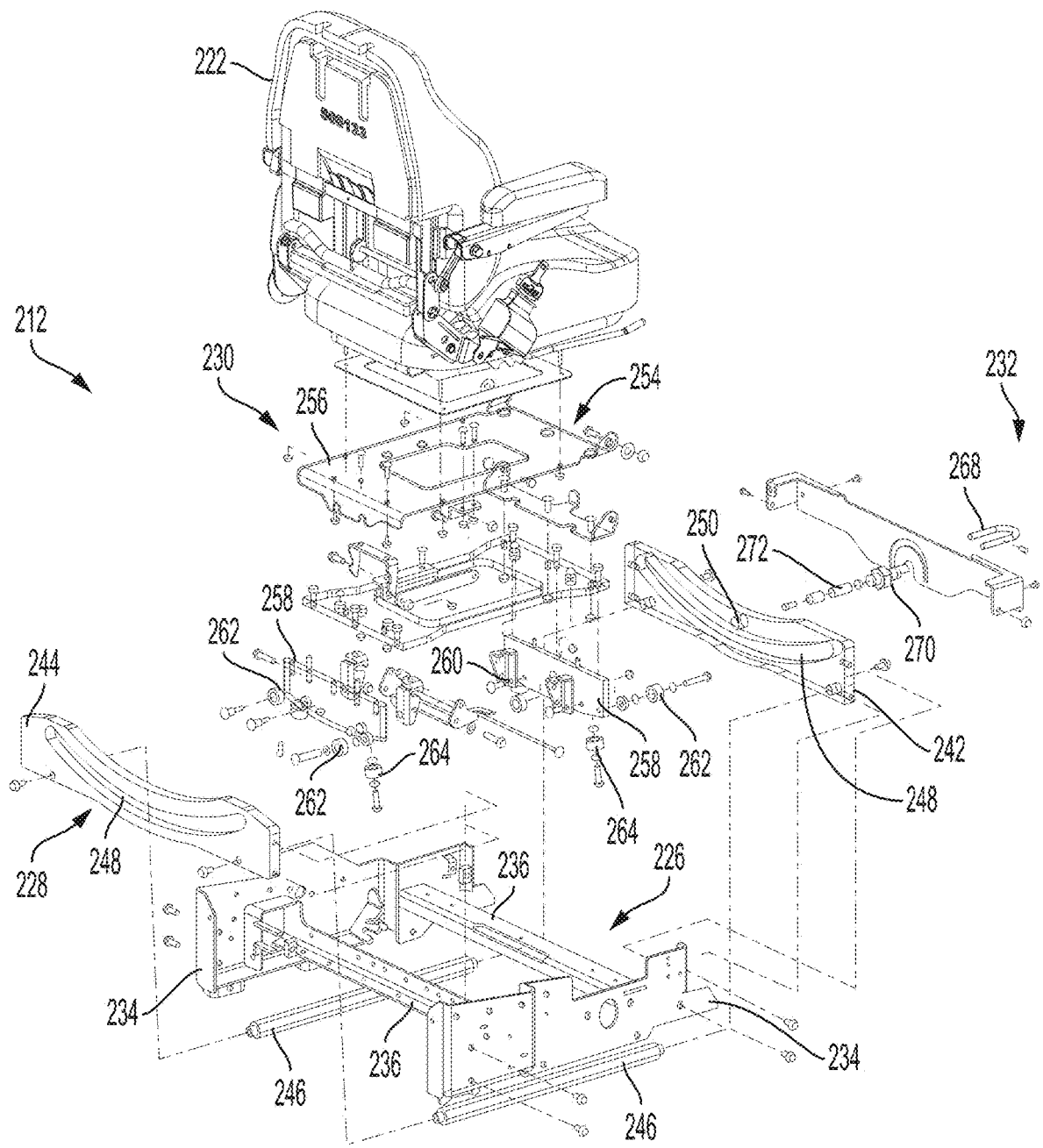
FIG. 13 is an exploded view of an embodiment of the seat assembly shown in FIG. 12.
Figure 14:
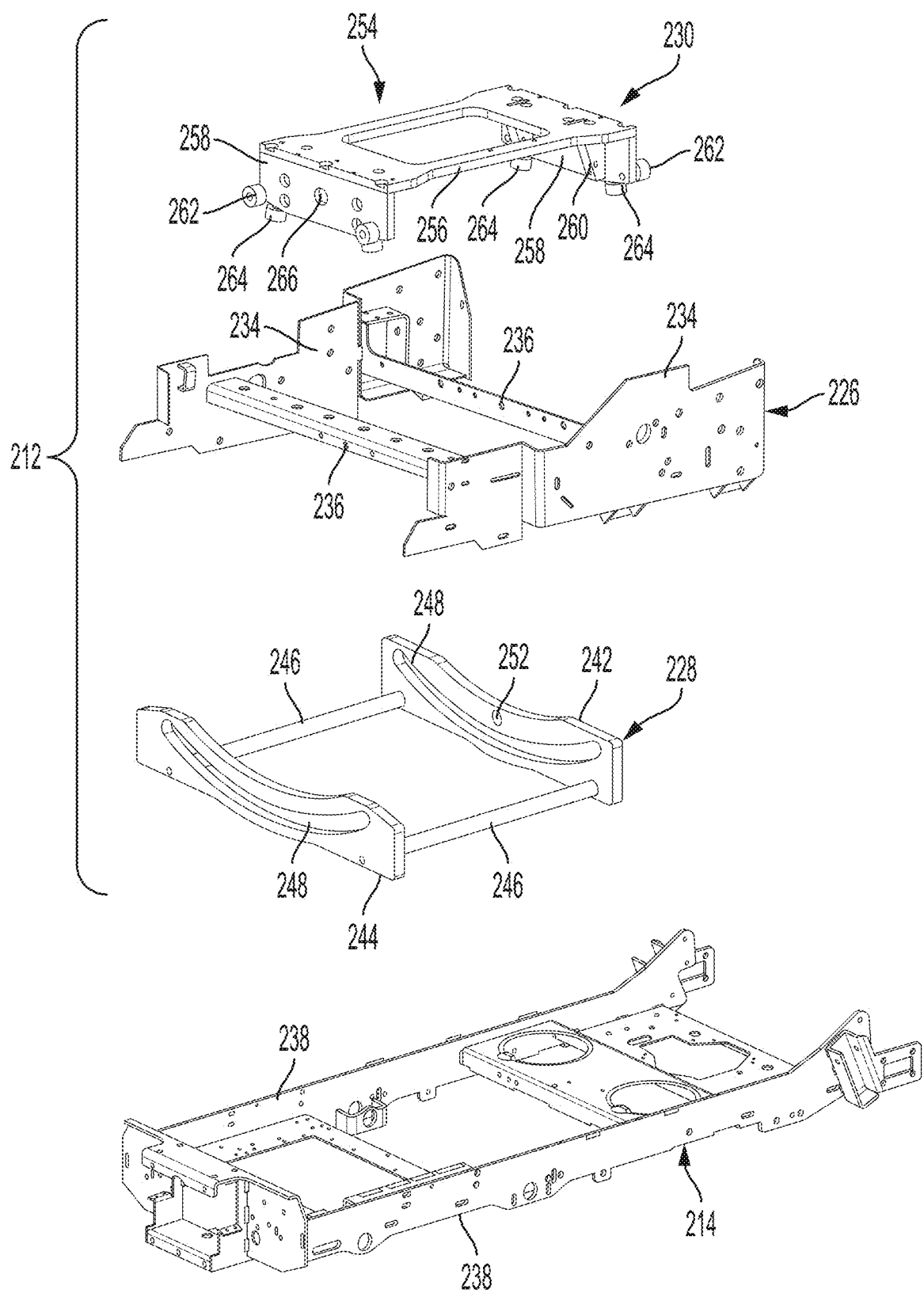
FIG. 14 is an exploded view of another embodiment of the seat assembly shown in FIG. 12.

As shown in FIGS. 12-14, an exemplary embodiment of a self-adjusting seat assembly 212 that is attachable to the frame 214 of a lawn maintenance vehicle is shown. The seat assembly 212 includes a base 226, a guide assembly 228, and a platform assembly 230. In some embodiments, the platform assembly 230 includes the seat 222 on which a user sits during operation of the lawn maintenance vehicle. The base 226 is attached to the frame 214. In other embodiments, the seat assembly 212 includes a locking assembly 232 the allows the guide assembly 228 to be selectively lockable relative to the base 226. The guide assembly 228 is attached to the base 226. The seat 222 is attached to the platform assembly 230, and the platform assembly 230 is selectively moveably connected to the guide assembly 228.

Figure 15:
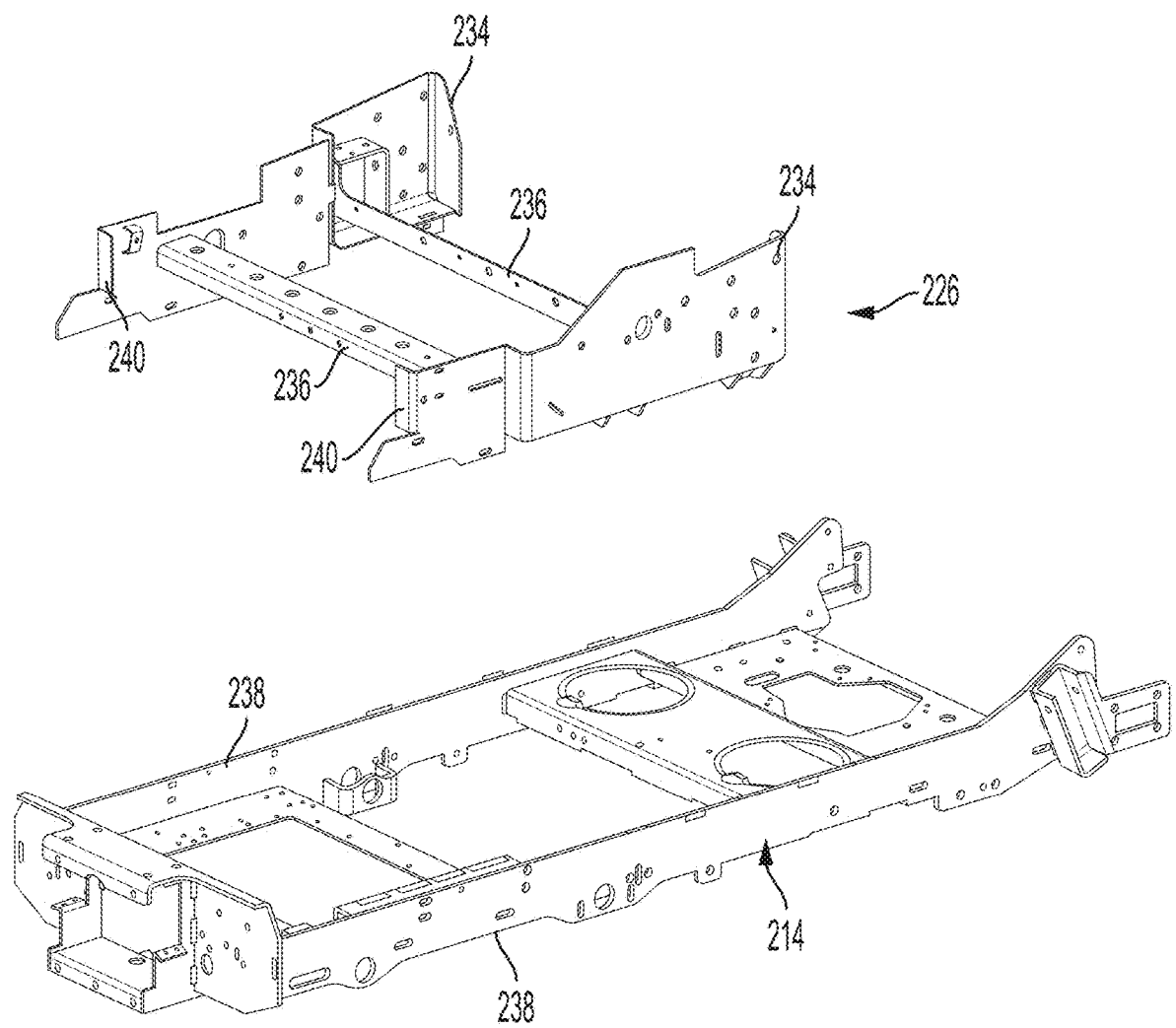
FIG. 15 is a perspective view of an assembled base of the seat assembly.
Figure 16:
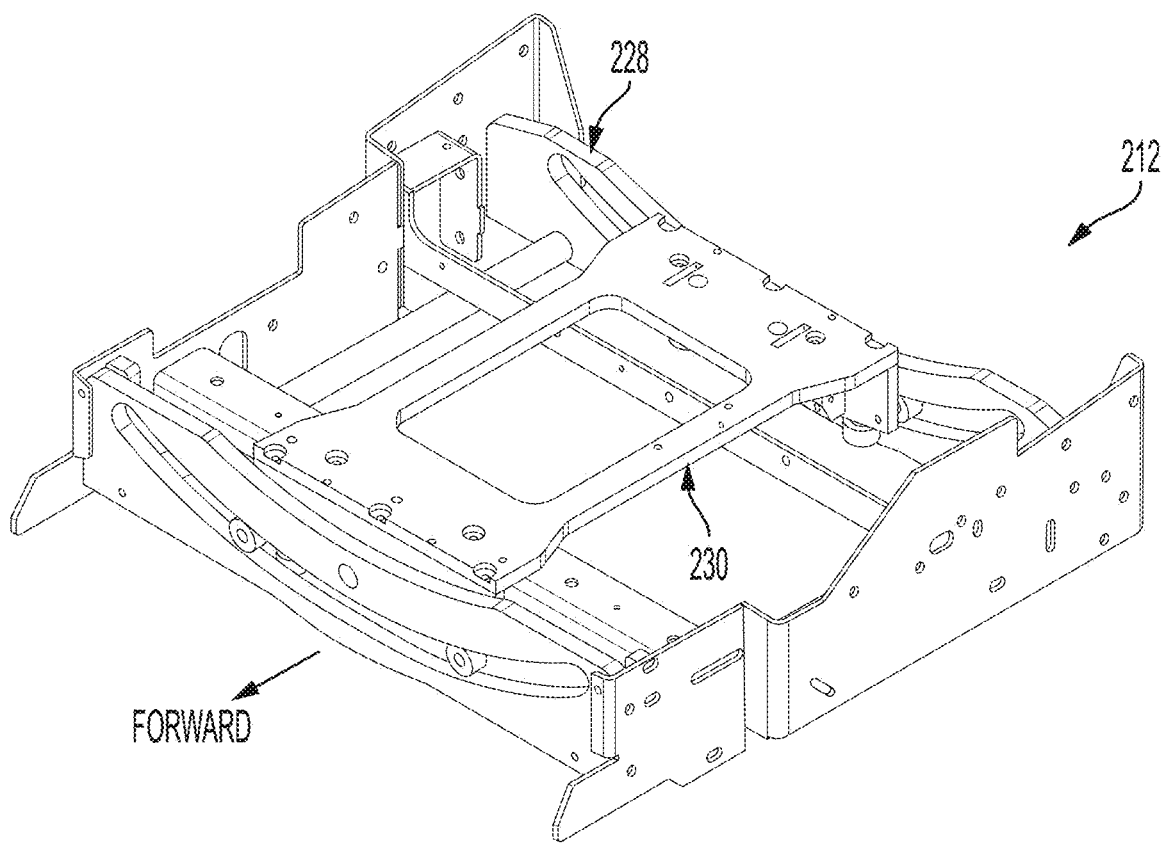
FIG. 16 is a perspective view of an assembled embodiment of the seat assembly without a locking assembly.

The base 226 of the seat assembly 212 provides a structural platform to connect the seat assembly 212 to the frame 214 of the lawn maintenance vehicle, as shown in FIGS. 15-16. In an embodiment, the base 226 includes a pair of side brackets 234 and a pair of cross brackets 236. The side brackets 234 are longitudinally aligned in the fore/aft direction (relative to the forward/reverse movement of the lawn maintenance vehicle). The side brackets 234 are spaced apart, wherein the side brackets 234 are attached to opposing rails 238 of the frame 214. In other embodiments, the frame 214 includes a structural member(s) such as a box or platform instead of opposing rails 238 to which the base 226 is attached. In the illustrated embodiment, each side bracket 234 is attached to a corresponding rail 238. It should be understood by one having ordinary skill in the art that the side brackets 234 can be attached to the rails 238 or the structural frame at any location, provided the side brackets 234 are laterally aligned sufficiently to be interconnected by way of the cross brackets 236. In some embodiments, each of the side brackets 234 is formed as a single member. In other embodiments, at least one of the side brackets 234 is formed of multiple pieces that are fixedly attached to each other to form a single structural member. It should be understood by one having ordinary skill in the art that the side brackets 234 can have mirrored shapes or have separate shapes, but that a portion of both side brackets are oriented parallel to each other to allow the guide assembly 228 to be properly aligned relative to the frame 214 of the lawn maintenance vehicle. In an embodiment, each of the side brackets 234 includes an elbow 240 positioned at or near the forward end of the side bracket 234. The elbow 240 is a portion of the side bracket 234 that extends substantially perpendicular to the longitudinally-aligned base. The elbows 240 of opposing side brackets 234 extend laterally inward toward the centerline of the lawn maintenance vehicle. The elbows 240 are configured to provide a portion of the side brackets 234 to which the guide assembly 228 is attachable. In other embodiments, the side brackets 234 are formed without an elbow 240 such that the guide assembly 228 is attached directly to the side brackets 234.

In an embodiment, the base 226 includes a pair of spaced-apart cross brackets 236 that extend laterally between the side brackets 234, as shown in FIGS. 15-16. The front cross bracket 236a is positioned adjacent to the front end of the side brackets 234, and the rear cross bracket 236b is positioned adjacent to the rear end of the side brackets 234. In an embodiment, the front cross bracket 236a is formed as a generally U-shaped member. The front cross bracket 236a includes a pair of opposing side members connected by an upper member extending between the side members. In an embodiment, the rear cross bracket 236b is formed as an L-shaped member. The rear cross bracket 236b includes a vertical member and a horizontal member that is attached to the bottom end of the vertical member. The cross brackets 236 are fixedly attached to the side brackets 234. The cross brackets 236 are configured to provide structural rigidity to the base 226 to reduce or eliminate any bending or torsional twisting as a result of the lawn maintenance vehicle traversing inclined, sloped, or otherwise uneven terrain. In an embodiment, the base 226 is connected to the frame 214 by way of spacers (not shown) that absorb some of the twisting and bending, thereby preventing such twisting and bending movement to be transferred to the base 226.

Figure 17:
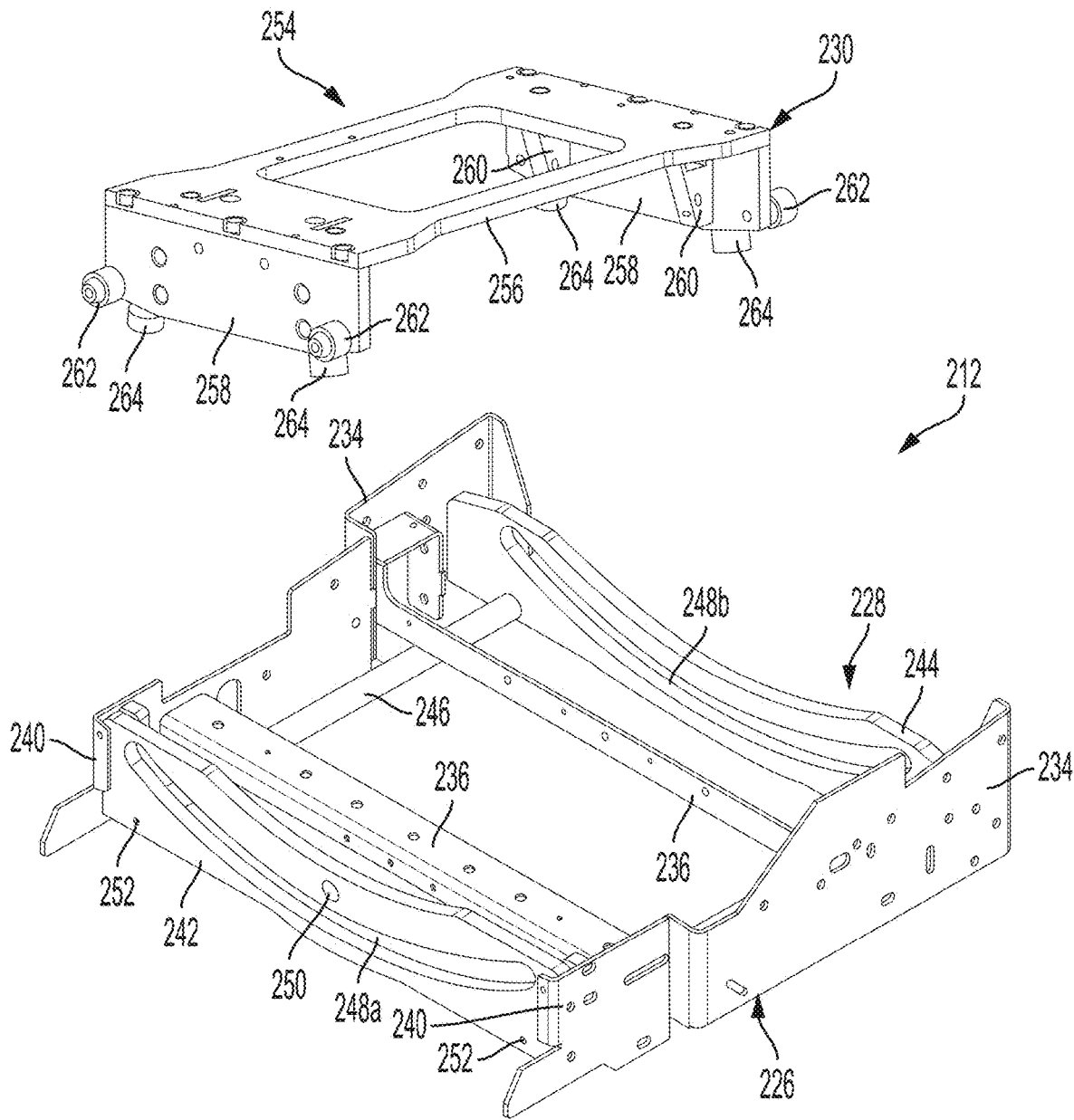
FIG. 17 is a perspective view of a platform assembly spaced apart from an assembled base and guide assembly.
Figure 18:
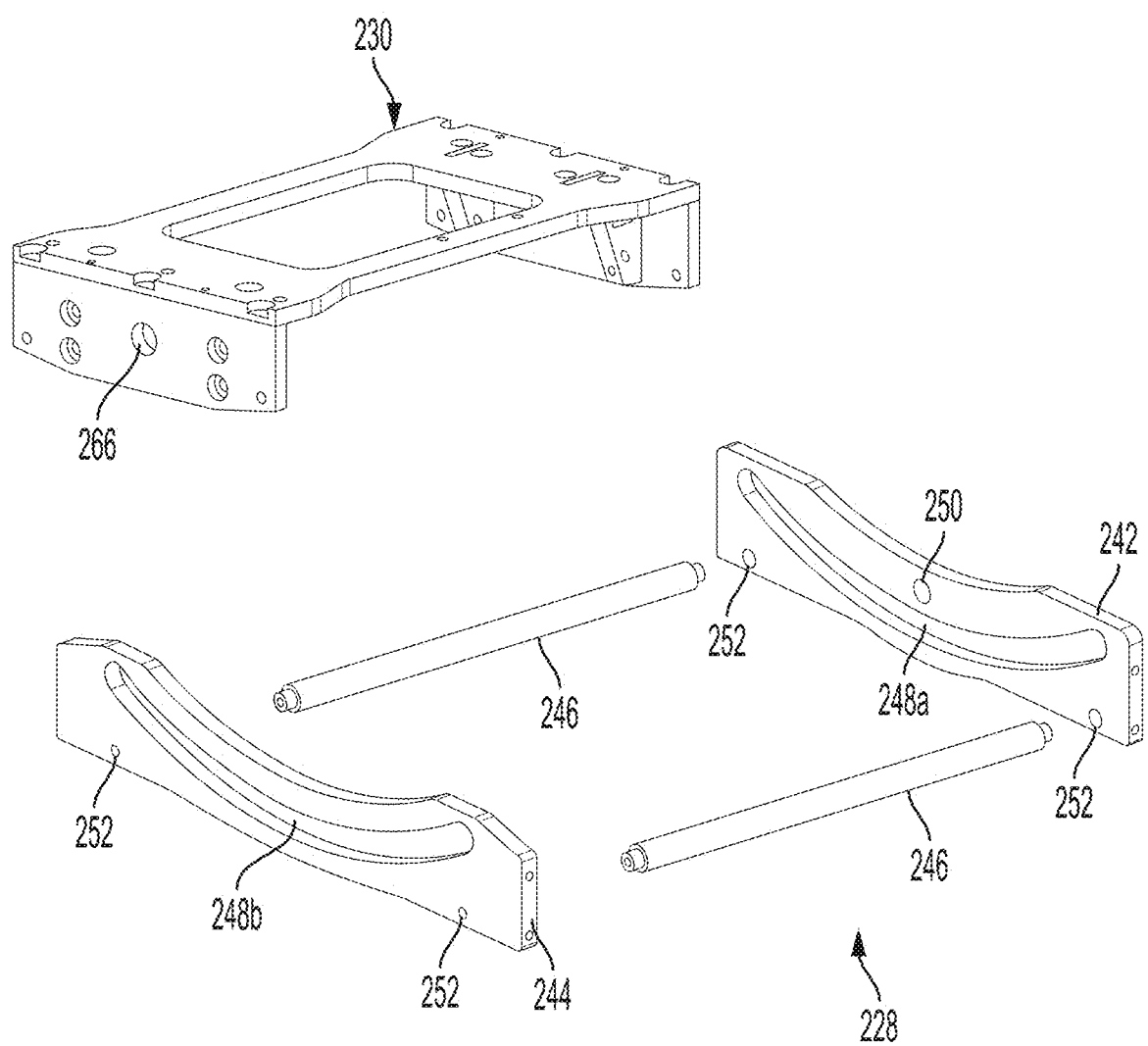
FIG. 18 is an exploded view of a portion of an embodiment of the guide assembly and platform assembly.

In the exemplary embodiment illustrated in FIGS. 16-18, the guide assembly 228 is attached to the base 226. In an embodiment, the guide assembly 228 includes a front guide plate 242, a rear guide plate 244, and a pair of rods 246 connecting the front and rear guide plates 242, 244. The guide assembly 228 is configured to receive the platform assembly 230, wherein the platform assembly 230 is selectively movable relative to the guide assembly 228.

The front guide plate 242 is a generally rectangular plate having a guide slot 248 formed through the thickness thereof, as shown in FIGS. 17-18. In an embodiment, the guide slot 248 is an arcuate, or curved aperture. The guide slot 248 is curved upwardly. In the embodiment illustrated in FIG. 20, the guide slot 248a is an arcuate shaped slot having a constant radius of curvature between opposing ends of the slot. The radius of curvature of the guide slot 248a is greater than five (5) inches. In an embodiment, the radius of curvature is between six (6) inches and seventy-two (72) inches. In other embodiments, the guide slot 248b has a variable concave/convex shape, wherein the slot guide 248b has a central portion that has a constant radius of curvature and the opposing end portions of the guide slot 248b have a constant radius of curvature in the convex, or curved opposite the central portion of the slot. In another embodiment, the guide slot 248c is a variable concave shape, wherein the central portion of the slot has a first radius of curvature in an upward direction and each end that extends from the central portion has a larger radius of curvature in the upward direction. In further embodiments, the guide slot 248d has a central portion having a constant radius of curvature in an upward direction and the opposing end portions of the guide slot 248d are tangential linear extensions from each end of the central portion. The slot 48 of the seat assembly 12 shown in FIGS. 14A-14B can also be formed as any of the slots 248a-248d shown in FIG. 20. The overall shape and/or curvature of the guide slot 248 can be optimized so that the movement of the platform assembly 230 relative to the guide assembly 228 is configured to maintain the head of the operator within the protective boundary of the roll-over protection system (ROPS) of the lawn maintenance vehicle, as shown in FIG. 10. It should be understood by one having ordinary skill in the art that the guide slot 248 may alternatively be curved in the downward direction or have any other curved shape.

In the illustrated embodiment, the front guide plate 242 further includes a locking aperture 250 positioned above the guide slot 248, as shown in FIGS. 17-18. It should be understood by one having ordinary skill in the art that the locking aperture 250 can be positioned above or below the guide slot 248. The locking aperture 250 is configured to receive a portion of the locking assembly 232 to selectively lock the platform assembly 230 to the guide assembly 228. In an embodiment, the locking aperture 250 is a threaded aperture. In other embodiments, the locking aperture 250 has a smooth surface that extends through the thickness of the front guide plate 242. The front guide plate 242 also includes a pair of attachment apertures 252, wherein each attachment aperture 252 is configured to receive one of the rods 246 for connecting the front guide plate 242 to the rear guide plate 244. The rods 246 are elongated, cylindrical members in which one end of each rod 246 is connected to the front plate 242 and the opposing end of each rod 246 is connected to the rear plate 32.

The front guide plate 242 extends laterally between the side brackets 234 of the base 226, wherein the front guide plate 242 is oriented substantially perpendicular to the side brackets 234, as shown in FIG. 17. The front guide plate 242 is attached to the opposing elbows 240 of the side brackets 234 adjacent to the forward end thereof. The front guide plate 242 is oriented vertically such that the arcuate guide slot 248 curves upwardly. The front guide plate 242 is spaced apart from the rear guide plate 244 such that the rear guide plate 244 is positioned longitudinally rearward of the front guide plate 242.

In an embodiment, the rear guide plate 244 also extends laterally between the side brackets 234 of the base 226, wherein the rear guide plate 244 is oriented substantially perpendicular to the side brackets 234, as shown in FIGS. 17-18. The rear guide plate 244 includes a guide slot 248 formed through the thickness thereof. In an embodiment, the guide slot 248 of the rear guide plate 244 is an arcuate aperture, wherein the aperture is curved upwardly. In the illustrated embodiment, the guide slot 248 has a constant radius of curvature between opposing ends of the aperture. The radius of curvature of the guide slot 248 of the rear guide plate 244 is the same as the radius of curvature of the guide slot 248 of the front guide plate 242. In some embodiments, the guide slot 248 has a central portion that has a constant radius of curvature and the opposing end portions of the guide slot 248 have a radius of curvature that is larger or smaller than the central portion. In further embodiments, the opposing end portions of the guide slot 248 are linear extensions of the central portion that has a constant radius of curvature.

As shown in FIG. 18, the rear guide plate 244 further includes a pair of attachment apertures 252. Each of the attachment apertures 252 is configured to receive an end of one of the rods 246. The attachment apertures 252 of the front and rear guide plates 242, 244 are positioned adjacent to the bottom edge thereof, but it should be understood by one having ordinary skill in the art that the attachment apertures 252 can also be attached adjacent to an upper edge of the front and rear guide plates 242, 244. Although the front and rear guide plates 242, 244 are shown as each having two attachment apertures 252, it should also be understood by one having ordinary skill in the art that the front and rear guide plates 242, 244 can include any number of attachment apertures 252 positioned outward from the guide slots 248 so long as the attachment apertures 252 do not interfere with the movement of the platform assembly 230 relative to the guide assembly 228.

The rear guide plate 244 extends laterally between the side brackets 234 of the base 226, wherein the rear guide plate 244 is oriented substantially perpendicular to the side brackets 234, as shown in FIG. 17. In the illustrated embodiment, the rear guide plate 244 is positioned adjacent to the rear end of the side brackets 234. In other embodiments, the rear guide plate 244 is attached to the side brackets 234 at the rear end of the side brackets 234. The guide slots 248 of the front and rear guide plates 242, 244 of the guide assembly 228 are configured to receive the platform assembly 230, thereby allowing the platform assembly 230 to rotate, slide, or otherwise move relative to the guide assembly 228 to maintain an operator sitting in the seat 222 (FIGS. 12-13) in an upright or substantially vertical orientation.

FIG. 17 illustrates an exemplary embodiment of a platform assembly 230 of the self-adjusting seat assembly 212. In the illustrated embodiment, the platform assembly 230 includes a seat support 254 that includes a central plate 256, a pair of support plates 258, and stabilizer plates 260 as well as guide wheels 262 and stabilizer wheels 264 attached to the seat support 254. In some embodiments, the platform assembly 230 includes stabilizer plates 260 extending between the support plates 258 and the central plate 256 to prevent the support plates 258 from bending relative to the central plate 256. The platform assembly 230 is configured to provide a structural base to which the seat 222 is attached and also to provide a support for movement of the platform assembly 230 relative to the guide assembly 228. In the embodiment of the platform assembly 230 illustrated in FIG. 16, the front support plate 258 is positioned longitudinally rearward of the front guide plate 242 and the rear support plate 258 is positioned longitudinally forward of the rear guide plate 244. In another embodiment, shown in FIG. 21A, the front support plate 258 is positioned longitudinally forward of the front guide plate 242 and the rear support plate 258 is positioned longitudinally rearward of the rear guide plate 244. The guide and stabilizer wheels 262, 264 are attached to the support plates 258 on the platform assembly 230. In a further embodiment illustrated in FIG. 21B, the platform assembly 230 includes a central plate 256 as well as front and rear guide plates 242, 244 attached thereto. The guide assembly 228 includes opposing support plates 258 connected by rods 246. The guide and stabilizer wheels 262, 264 are attached to the support plates 258 on the guide assembly 228.

In an embodiment, the central plate 256 of the seat support 254 of the platform assembly 230 is a generally flat member having a substantially constant thickness, as shown in FIG. 17. The central plate 256 is oriented in a substantially horizontal manner when the seat assembly 212 is in a locked position, as will be described below. In some embodiments, the central plate 256 is a generally solid plate member having apertures formed therethrough to allow various components, such as the seat 222, to be attached thereto. In the illustrated embodiment, the central plate 256 includes a central aperture formed through the middle portion thereof. The central aperture is configured to reduce the overall weight of the seat assembly 212 while also providing a conduit through which electrical wires or other components can pass so as to prevent them from interfering with the movement of the platform assembly 230 relative to the guide assembly 228. The thickness and overall size and shape of the central plate 256 is configured to withstand generally static loads from the weight of the user but is also able to withstand the torsional and other stresses experienced when the platform assembly 230 moves relative to the guide assembly 228 and also as the lawn maintenance vehicle travels over sloped or uneven ground. The longitudinal axis of the central plate 256 is generally parallel to the longitudinal axis of the lawn maintenance vehicle.

The support plates 258 of the seat support 254 of the platform assembly 230, as shown in FIG. 17 are attached to a lower surface of the central plate 256. The support plates 258 are attached to the opposing front and rear ends, or adjacent thereto, of the central plate 256. The support plates 258 are oriented vertically and are positioned such that they extend perpendicular to the longitudinal axis of the lawn maintenance vehicle. The support plates 258 are spaced apart from each other. In some embodiments, the support plates 258 are attached to opposing ends of the central plate 256. In other embodiments, the support plates 258 are attached adjacent to, but spaced away from, the opposing ends of the central plate 256. The support plates 258 extend from the lower surface of the central plate 256 in a substantially perpendicular manner, wherein the central plate 256 and support plates 258 for an inverted U-shaped structure.

The front support plate 258 includes an indexing aperture 266 configured to selectively receive the indexing rod of the locking assembly 232 for preventing movement or sliding of the platform assembly 230 relative to the guide assembly 228. In another embodiment, the central plate 256 and support plates 258 are integrally formed as a one-piece member.

In an exemplary embodiment, a pair of stabilizer plates 260 are attached to each of the support plates 258 and extend to the central plate 256 of the seat support 254, as shown in FIG. 17. In the illustrated example, each of the stabilizer plates 260 is formed as a right triangular member. The stabilizer plates 260 are attached to the central plate 256 and one of the support plates 258 through welding or other manner of fixed attachment. The stabilizer plates 260 are configured to provide structural support between the central plate 256 and the support plate 258. The pair of stabilizer plates 260 are spaced apart from each other. It should be understood by one having ordinary skill in the art that the platform assembly 230 can also be made of a single stamped or molded piece.

In an embodiment, the central plate 256, support plates 258, and the stabilizer plates 260 are formed of the same material. These plates 256, 258, 260 can be formed of aluminum, steel, plastic, or any other material sufficient to withstand the various stresses experienced. Although the illustrated embodiment of the platform assembly 230 is shown as being formed of multiple plates attached together, it should be understood by one having ordinary skill in the art that the platform assembly 230 can also be formed of a single piece of stamped metal, a single piece of stamped metal with additional reinforcing ribs or stabilizer pieces, or a single molded metal piece.

In an embodiment, a first pair of guide wheels 262 are attached to the front support plate 258, and a second pair of guide wheels 262 are attached to the rear support plate 258, as shown in FIGS. 14 and 16-17. The first and second pair of guide wheels 262 extend longitudinally from the front and rear support plates 258. In the illustrated embodiment, the first pair of guide wheels 262 extend longitudinally forward from the forwardly-directed surface of the front support plate 258, and the second pair of guide wheels 262 extend longitudinally rearward from the rearwardly-directed surface of the rear support plate 258. In other embodiments, the first pair of guide wheels 262 are attached to the rearwardly-directed surface of the front support plate 258, and the second pair of guide wheels 262 are attached to the forwardly-directed surface of the rear support plate 258. In some embodiments, three guide wheels 262 are attached to the front support plate 258, and three other guide wheels 262 are attached to the rear support plate 258. It should be understood by one having ordinary skill in the art that the platform assembly 230 can include any number of guide wheels 262 attached to the front support plate 258 and/or the rear support plate 258. In some embodiments, the number of guide wheels 262 attached to the forwardly-directed surface of the front support plate 258 can be different than the number of guide wheels 262 attached to the rearwardly-directed surface of the rear support plate 258. It should also be understood that the guide wheels 262 can also be attached to other surfaces of the front and rear support plates 258 as long as the guide wheels 262 extend longitudinally therefrom. The guide wheels 262 attached to the front and rear support plates 258 are spaced apart from each other. Because the front and rear support plates 258 are oriented substantially parallel to the corresponding front and rear guide plates 242, 244, the guide wheels 262 extend longitudinally from the front and rear support plates 258 to be received within a corresponding guide slot 248 of the guide assembly 228 while ensuring that the front support plate 258 is spaced apart from the front guide plate 242 and the rear support plate 258 is spaced apart from the rear guide plate 244.

In the exemplary embodiment shown in FIGS. 14 and 16-17, a first pair of stabilizer wheels 264 is attached to the front support plate 258, and a second pair of stabilizer wheels 264 is attached to the rear support plate 258. The stabilizer wheels 264 extend vertically downward from the front and support plates 258. In another embodiment, three stabilizer wheels 264 are attached to both the front and rear support plate 258. It should be understood by one having ordinary skill in the art that the platform assembly 230 can include any number of stabilizer wheels 264 attached to the front support plate 258 and/or the rear support plate 258. In some embodiments, the number of stabilizer wheels 264 attached to the front support plate 258 can be different than the number of stabilizer wheels 264 attached to the rear support plate 258. The stabilizer wheels 264 extend downwardly from the front and rear support plates 258. It should also be understood that the stabilizer wheels 264 can also be attached to any surface of the front and rear support plates 258 as long as the stabilizer wheels 264 extend downwardly in a manner that the stabilizer wheels 264 contact the rearwardly-directed surface of the front guide plate 242 or the forwardly-directed surface of the rear guide plate 244. The stabilizer wheels 264 attached to the front and rear support plates 258 are spaced apart from each other. The stabilizer wheels 264 are configured to contact the front and rear guide plates 242, 244 to prevent disengagement of the guide wheels 262 from their corresponding guide slots 248 as a result of flexing or bending of the seat support 254 of the platform assembly 230.

In an embodiment, the guide wheels 262 attached to the front and rear support plates 258 of the seat support 254 are configured to engage with the guide slots 248 of the front and rear guide plates 242, 244, and the stabilizer wheels 264 attached to the front and rear support plates 258 of the seat support 254 are configured to engage with the inwardly-directed surfaces of the front and rear guide plates 242, 244 to provide a smooth rolling movement of the platform assembly 230 relative to the guide assembly 228.

The guide wheels 262 and the stabilizer wheels 264 include a cylindrical outer contact surface surrounding a roller bearing that allows the outer surface of the guide wheels 262 and stabilizer wheels 264 to contact and roll along the surfaces of the front and rear guide plates 242, 244. In some embodiments, the bearing surface of the guide wheels 262 and the stabilizer wheels 264 are flat. In other embodiments, the bearing surface of the guide wheels 262 and the stabilizer wheels 264 are crowned to create a line of contact between each of the guide and stabilizer wheels 262, 264 and the guide assembly 228.

Figure 19A:
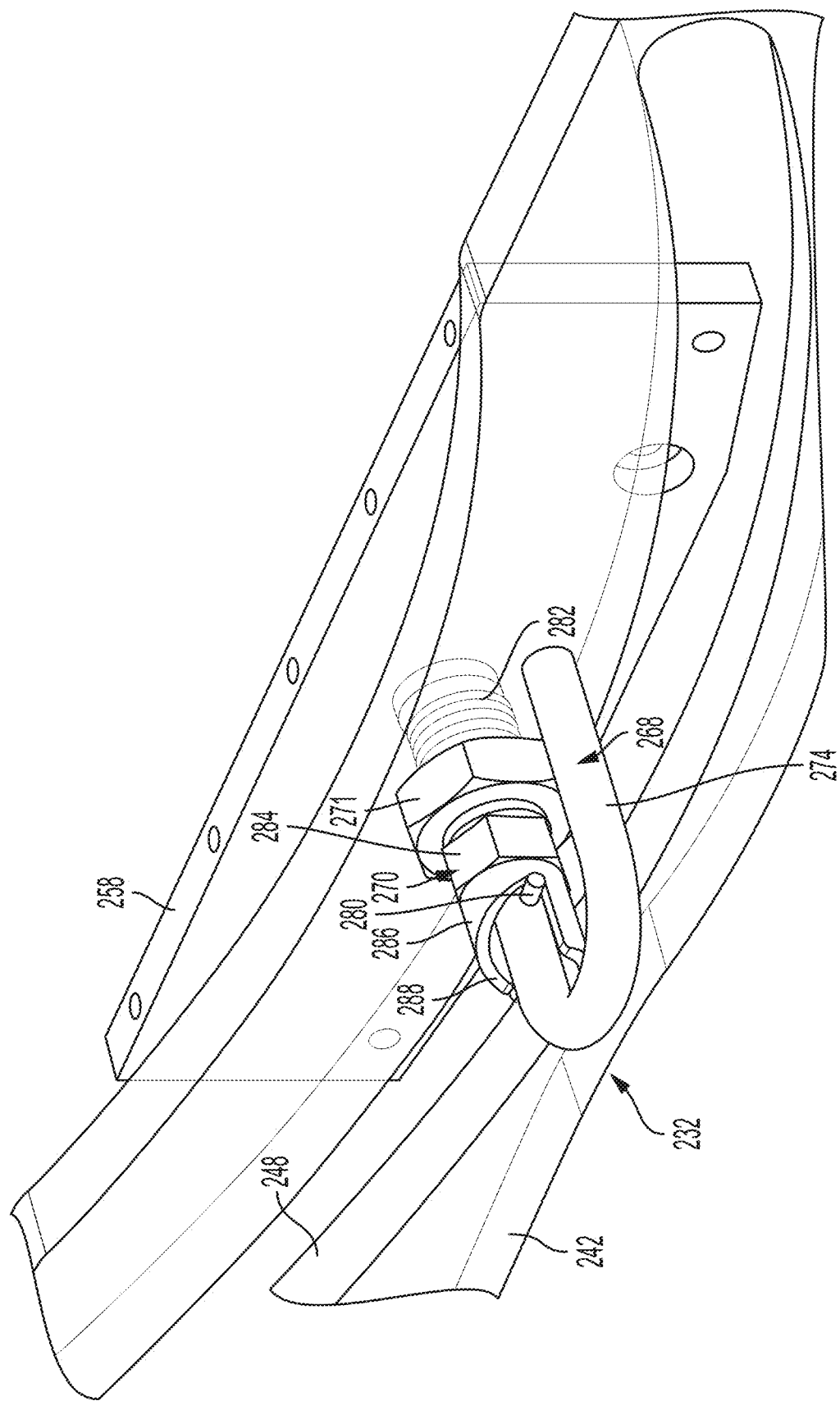
FIG. 19A is a perspective view of an embodiment of a locking assembly in a locked position.
Figure 19B:
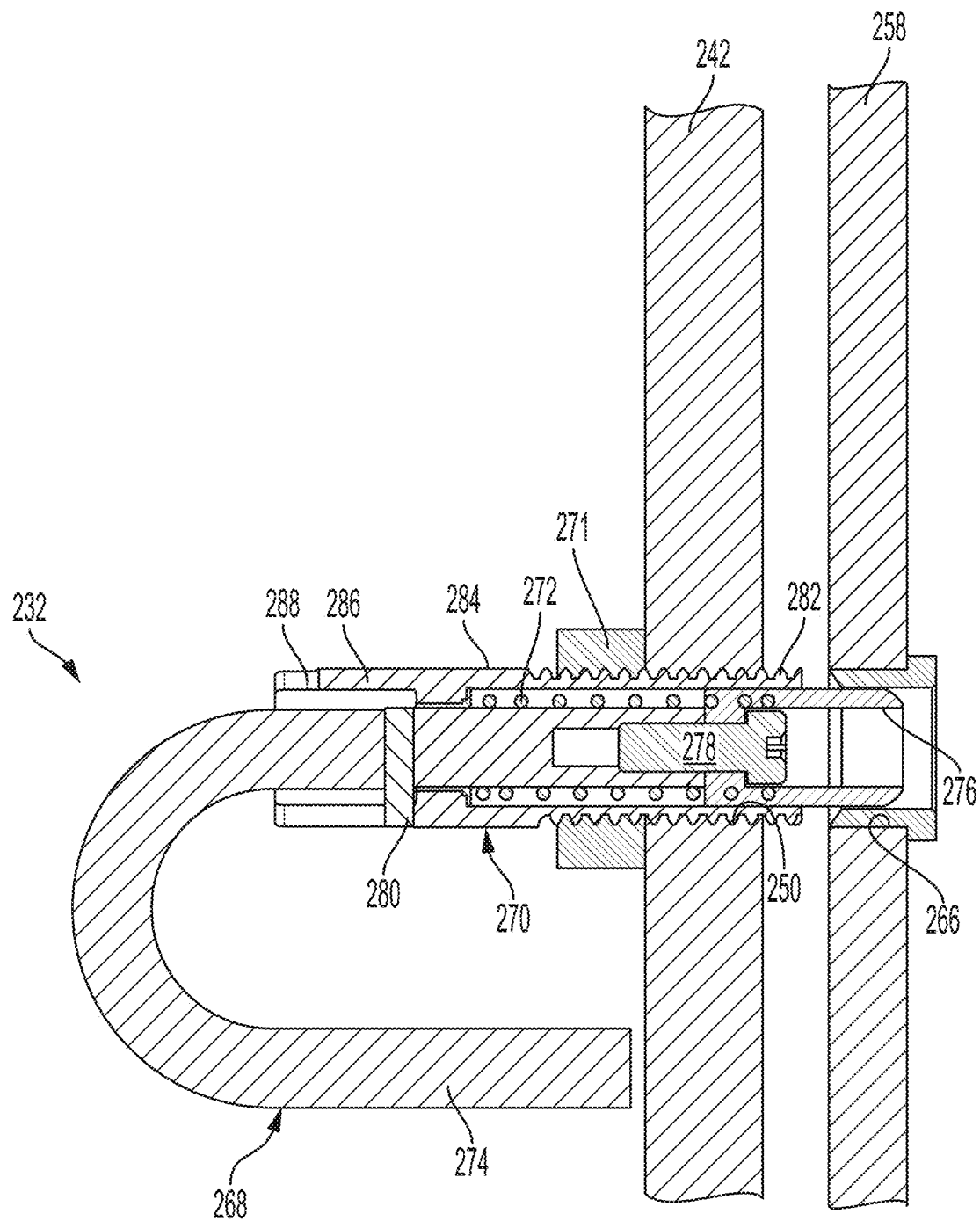
FIG. 19B is a cross-sectional view of the locking assembly shown in FIG. 8A in the same locked position.
Figure 19C:
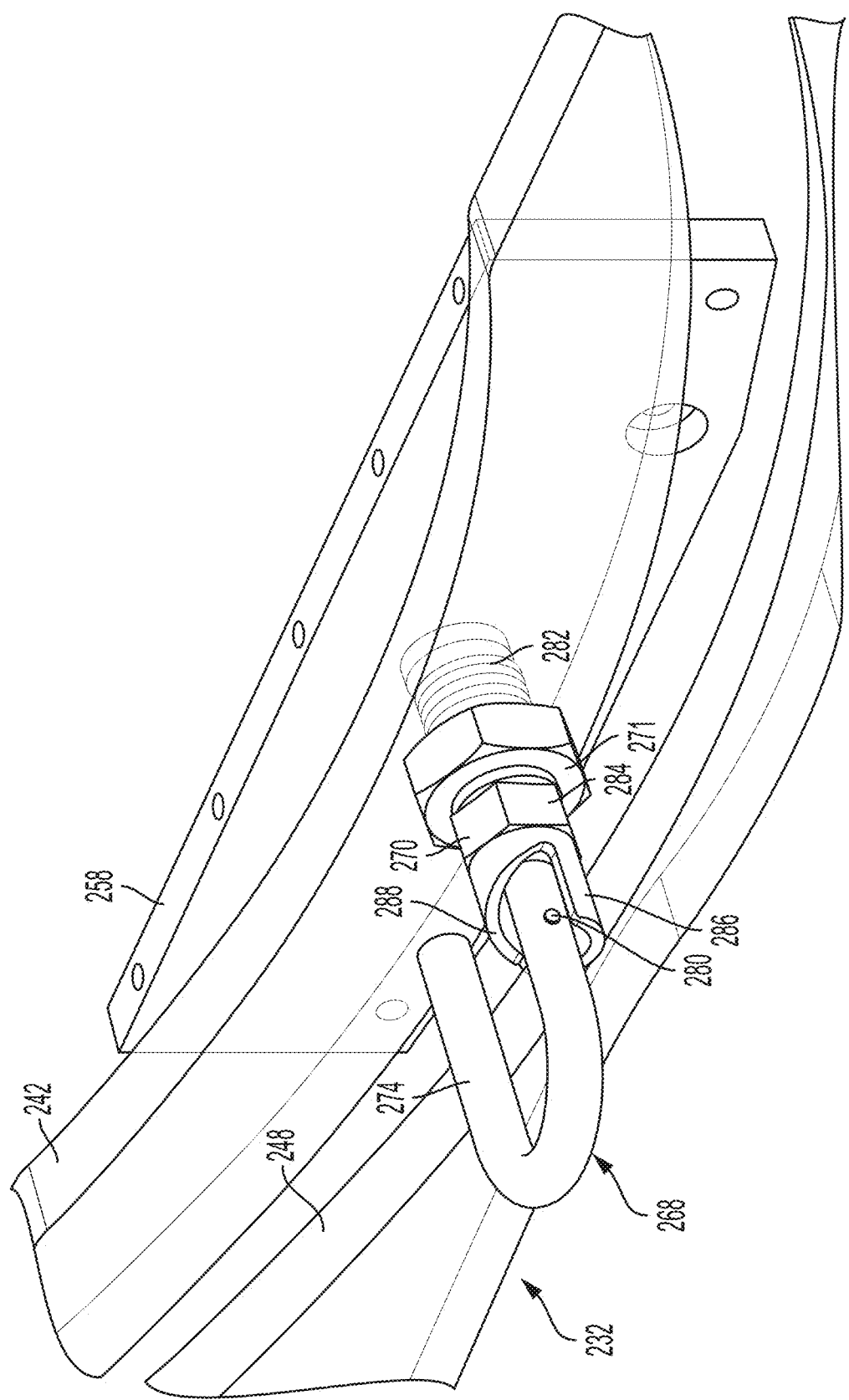
FIG. 19C is a perspective view of the locking assembly of FIG. 8A in an unlocked position.
Figure 19D:
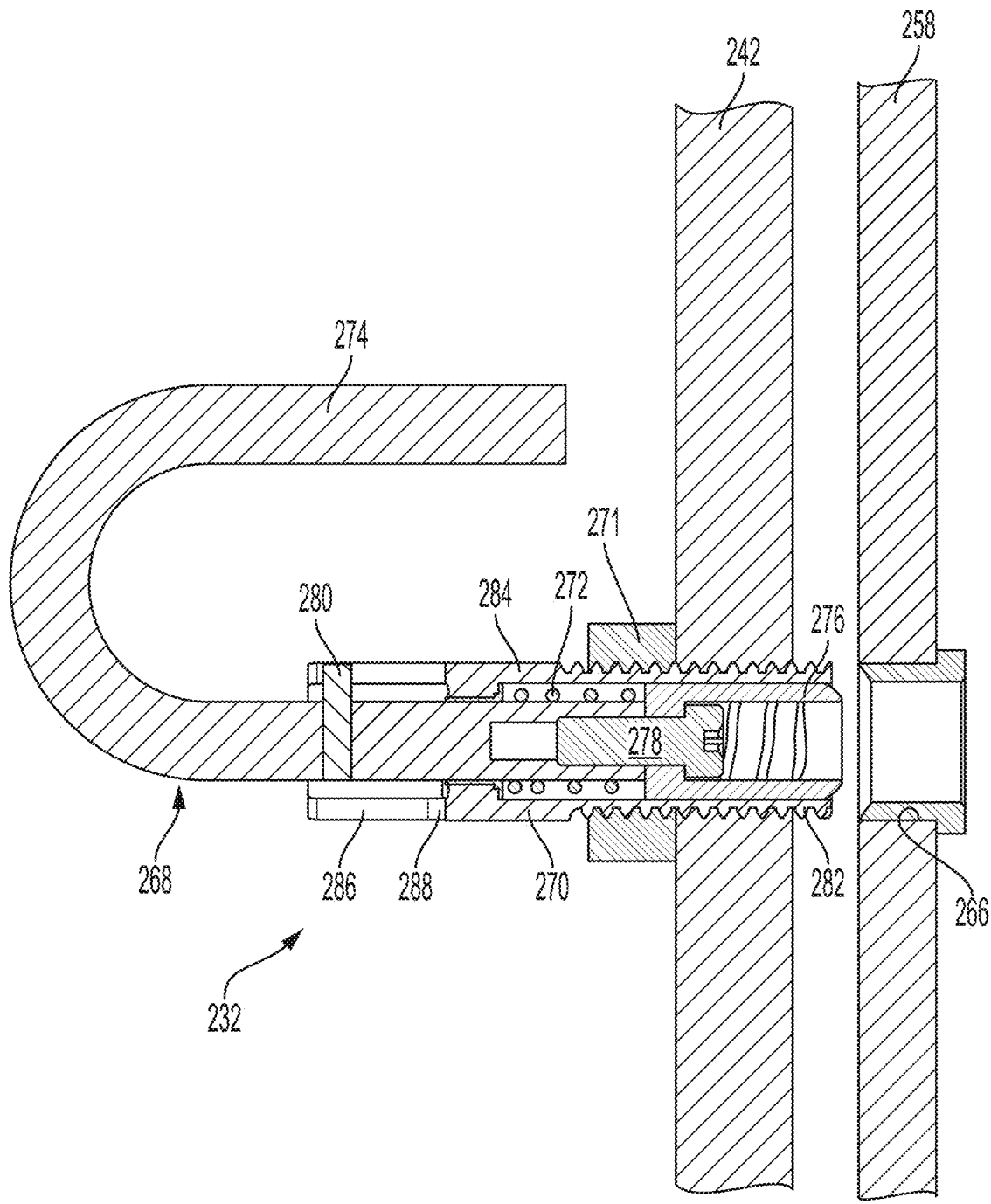
FIG. 19D is a cross-sectional view of the locking assembly shown in FIG. 8A in an unlocked position.

Referring to FIGS. 13 and 19A-19D, an exemplary embodiment of a locking assembly 232 is shown. The locking assembly 232 is configured to selectively lock movement or sliding of the platform assembly 230 relative to the guide assembly 228. The locking assembly 232 is switchable between a locked position (FIGS. 19A-19B) and an unlocked position (FIGS. 19C-19D). In an embodiment, the locking assembly 232 includes an indexing rod 268, cam bolt 270, and a biasing member 272. The cam bolt 270 is threadingly engaged with the front guide plate 242 of the guide assembly 228. The indexing rod 268 rotates within the cam bolt 270 which causes simultaneous translation of the indexing rod 268 relative to the cam bolt 270, wherein such translational movement of the indexing rod 268 causes the indexing rod 268 to engage and disengage from the indexing aperture 266 of the front support plate 258 of the seat support 254.

In an embodiment, the indexing rod 268 includes a J-shaped rod 274 that includes a turnable end and an adjusted end, wherein the turnable end is the end of the rod 274 that the user grasps and rotates relative to the front guide plate 242 and the adjusted end translates longitudinally in response to rotation of the turnable end. The turnable end is rotatable between a locked position (FIGS. 19A-19B) and an unlocked position (19C-19D). In an embodiment, the turnable end of the rod 274 includes a bore formed partially into the end, wherein the bore is formed axially into the end of the rod 274, as shown in FIG. 19B. In an embodiment, the indexing rod 268 also includes a pin 276 attached to the distal end of the turnable end of the rod 274, wherein a threaded bolt 278 attaches the pin 276 to the rod 274. The pin 276 is configured to engage and disengage the indexing aperture 266 of the front support plate 258. It should be understood by one having ordinary skill in the art that the distal end of the indexing rod 268 can be configured to engage/disengage the indexing aperture 266 without the pin 276 being attached thereto.

As shown in FIGS. 19A-19B, the indexing rod 268 includes a camming pin 280 that is attached to the thickness of the rod 274 such that a portion of the camming pin 280 extends substantially perpendicular to the rotational axis of the rod 274. The camming pin 280 is configured to cooperate with the cam bolt 270 to cause translation of the turned end of the rod 274. The camming pin 280 is a generally cylindrical member.

The biasing member 272 is configured to surround the portion of the rod 274 positioned within the cam bolt 270, as shown in FIGS. 19B and 19D. One end of the biasing member 272 is positioned against a shoulder of the pin 276 located at the turned end of the rod 274 and surrounds the outer surface of the turned end of the rod 274. The opposing end of the biasing member 272 is positioned against the shoulder formed by the bore formed into the cam bolt 270. The cam bolt 270 is threadingly engaged with the front guide plate 242 such that shoulder within the bore of the cam bolt 270 provides an anchor or surface against which the biasing member 272 can contact. In an embodiment, the biasing member 272 is formed as a compression spring. In other embodiments, the biasing member 272 is formed as a cylindrical elastomeric member. It should be understood by one having ordinary skill in the art that the biasing member 272 can be formed of any material sufficient to provide a biasing or spring force on the rod 274 so as to bias the rod 274 into engagement with the indexing aperture 266.

The cam bolt 270 of the locking assembly 232 is threadingly engaged with the locking aperture 250 of the front guide plate 242, as shown in FIGS. 19A-19B. In an embodiment, the cam bolt 270 is a one-piece member that includes a threaded shank 282, a nut 284, and a cam member 286. The shank 282 is an elongated member having a hollowed core. The turned end of the rod 274 is received within the hollowed core of the shank 282. The hollowed core of the shank 282 provides a shoulder against which one end of the biasing member 272 contacts to bias the rod 274. In the illustrated embodiment, the cam bolt 270 is secured to the front guide plate 242 by way of a threaded bolt 271 attached to the forwardly-directed surface of the front guide plate 242. In other embodiments, the cam bolt 270 is attached to the front guide plate 242 by way of a threading engagement between the outwardly-directed threads on the shank 282 and the inwardly-directed threads of the locking aperture 250.

The nut 284 of the cam bolt 270 of the locking assembly 232 is positioned adjacent to the end of the shank 282, as shown in FIGS. 19A-19B. The nut 284 is configured to allow the cam bolt 270 to be easily attached to or detached from the front guide plate 242.

As shown in FIGS. 19A-19B, the cam member 286 is positioned immediately adjacent to the nut 284 and forms an end of the cam bolt 270. In an embodiment, the cam member 286 is configured to provide a cam surface 288 against which the camming pin 280 slides as the indexing rod 268 is rotated relative to the cam bolt 270. The cam surface 288 is formed by a cut out in the end of the cam bolt 270. The cam surface 288 is a substantially helically-formed surface that extends about 180°, which limits the amount of rotation of the indexing rod 268 relative to the cam bolt 270. The cam surface 288 provides an upper seat and a lower seat at opposing ends thereof, wherein the upper and lower seats of the cam surface 288 define the sliding limits of the camming pin 280 along the cam surface 288. When the camming pin 280 is located in the lower seat of the cam surface 288, the locking assembly 232 is in a locked position in which the pin 276 is located within the indexing aperture 266 of the front support plate 258. When the camming pin 280 is located in the upper seat of the cam surface 288, the locking assembly 232 is in an unlocked position in which the pin 276 is located outside (or disengaged from) the indexing aperture 266 of the front support plate 258.

In operation, the self-adjusting seat assembly 212 is configured to allow the seat 222 of the platform assembly 230 to rotate or move relative to the frame 214 of the lawn maintenance vehicle in order to maintain a user in a substantially upright or vertical orientation as the lawn maintenance vehicle traverses uneven or sloped ground. The seat support 254 of the platform assembly 230 includes guide wheels 262 extending forwardly from a front end thereof and guide wheels 262 extending rearwardly thereof, wherein the guide wheels 262 are received within a corresponding curved guide slot 248 formed through front and rear guide plates 242, 244 of the guide assembly 228. The guide wheels 262 allow the platform assembly 230 to slide or move relative to the guide assembly 228. The guide slots 248 are arcuate-shaped and have a center of a radius of curvature with an axis of rotation located at or near the center of an operator's chest (understanding that the axis of rotation will be different for each rider based upon the size and shape of the operator). By positioning the axis of rotation of the platform assembly 230 near the center of the chest of the operator, the amount of movement of the platform assembly 230 relative to the guide assembly 228 to maintain the user in an upright or generally vertical orientation is minimized.

In order to operate the locking assembly 232, the biasing member 272 biases the indexing rod 268 toward the locked position (FIGS. 19A-19B) in which the camming pin 280 extending from the rod 274 is positioned at the lower seat of the cam surface 288. When the locking assembly 232 is in the locked position, the pin 276 attached to the end of the rod 274 or the distal end of the rod (if there is no pin 276 attached thereto) is received within the indexing aperture 266. The engagement of the pin 276 of end of the rod 274 within the indexing aperture 266 prevents rotation or sliding of the platform assembly 230 relative to the guide assembly 228. To unlock the platform assembly 230 from the guide assembly 228, the operator rotates the indexing rod 268 in a counter-clockwise direction (when looking rearwardly from the front of the lawn maintenance vehicle) about 180° until the pin 276 is positioned in the upper seat at the opposing end of the cam surface 288, as shown in FIGS. 19C-19D. As the indexing rod 268 is rotated counter-clockwise, the pin 276 slides along the cam surface 288 of the cam member 286 which causes the rod 274 to translate longitudinally away from the front guide plate 242 and against the biasing force of the biasing member 272. As the rod 274 translates away from the front guide plate 242, the pin 276 or the turned end of the rod 274 translates out of the indexing aperture 266 of the front support plate 258 of the seat support 254. Once, the pin 276 or the end of the rod 274 completely disengages from the indexing aperture 266, the seat support 254 and the seat 222 of the platform assembly 230 are free to slide, move, or otherwise rotate relative to the guide assembly 228. The friction between the pin 276 and the cam surface 288 maintains the indexing rod 268 in the unlocked position, overcoming the biasing force by the biasing member 272.

The locking assembly 232 is configured to prevent sliding, rotation, or movement of the platform assembly 230 and the seat 222 relative to the guide assembly 228. Locking the movement of the seat 222 is particularly important during mounting and dismounting the lawn maintenance vehicle to prevent the seat 222 from sliding out from underneath the operator, which may lead to accidental injuries. It should be understood by one having ordinary skill in the art that although the locking assembly 232 described above is a manually-adjusted locking mechanism that requires the operator to rotate the indexing rod 268 to lock/unlock the platform assembly 230 to the guide assembly 228, the locking assembly 232 can alternatively be formed of an electrical or electro-mechanical mechanism that can be actuated by a button, switch, or other actuating mechanism that is ergonomically located or otherwise easily accessible by an operator.

While preferred embodiments of the present invention have been described, it should be understood that the present invention is not so limited and modifications may be made without departing from the present invention. The scope of the present invention is defined by the appended claims, and all devices, processes, and methods that come within the meaning of the claims, either literally or by equivalence, are intended to be embraced therein.

What is claimed is:
1. A passive self-adjusting seat assembly for attachment to a frame of a lawn maintenance vehicle, said passive self-adjusting seat assembly comprising:
   a base attached to said frame, said base including a pair of opposing side brackets connected by at least two spaced-apart cross brackets that extend laterally between the side brackets;
   a guide assembly connected to said base, said guide assembly including a front guide plate and a rear guide plate oriented parallel to each other and operatively connected to each other, wherein each of said guide plates includes a curved guide slot formed therein; and
   a platform assembly including a seat support and a seat attached to said seat support, said platform assembly further including a plurality of guide wheels extending longitudinally forward or rearward from a front end of said seat support and longitudinally forward or rearward from a rear end of said seat support wherein each of said guide wheels is received within said guide slot of said front guide plate or said guide slot of said rear guide plate;

wherein said platform assembly is selectively slidable relative to said guide assembly in response to said lawn maintenance vehicle traversing uneven or sloped ground to maintain a user in a substantially vertical orientation.

2. The passive self-adjusting seat assembly of claim 1 further comprising a locking assembly connected to said guide assembly for selectively engaging said platform assembly to prevent sliding or movement of said platform assembly relative to said guide assembly.

3. The passive self-adjusting seat assembly of claim 2, wherein said locking assembly includes an indexing rod operatively connected to said front guide plate, wherein said indexing rod is longitudinally translatable relative to said front guide plate so that an end of said indexing rod selectively engages an indexing aperture formed in said platform assembly to prevent said platform assembly from sliding or moving relative to said guide assembly.

4. The passive self-adjusting seat assembly of claim 2, wherein said locking assembly provides a locked position in which said locking assembly engages said platform assembly to prevent sliding or movement of said platform assembly relative to said guide assembly, and said locking assembly also provides an unlocked position in which said locking assembly disengages from said platform assembly to allow sliding or movement of said platform assembly relative to said guide assembly.

5. The passive self-adjusting seat assembly of claim 2, wherein said locking assembly includes a cam bolt attached to said front guide plate, an indexing rod at least partially positioned within said cam bolt, and a biasing member engages said cam bolt and said indexing rod for biasing said indexing rod longitudinally within said cam bolt.

6. The passive self-adjusting seat assembly of claim 5, wherein said cam bolt includes a hollow shank and a cam member located at an end of said hollow shank, said cam member having a cam surface, wherein a camming pin extending from said indexing rod slides along said cam surface when said indexing rod is rotated between a locked position and an unlocked position, said rotation of said indexing rod causes said indexing rod to translate longitudinally relative to said cam bolt.

7. The passive self-adjusting seat assembly of claim 1 wherein each of said curved guide slots is formed as an arcuate shape.

8. The passive self-adjusting seat assembly of claim 7 wherein said guide slots have a radius of curvature greater than five (5) inches.

9. The passive self-adjusting seat assembly of claim 7 wherein a center of a radius of curvature of said guide slots is configured to be located near an operator's chest when seated.

10. The passive self-adjusting seat assembly of claim 9, wherein said platform assembly includes a base, a front guide plate attached to a front end of said base, a rear guide plate attached to a rear end of said base, and a pair of said guide wheels is attached to said front guide plate and a pair of said guide wheels is attached to said rear guide plate.

11. The passive self-adjusting seat assembly of claim 1, wherein said platform assembly includes a seat support on which said seat is attached.

12. A locking assembly for a passive self-adjusting seat assembly, said seat assembly having a platform assembly engaging and electively movable relative to a guide assembly, said platform assembly including a support plate and said guide assembly including a guide plate positioned parallel to said support plate, said locking assembly comprising:
a cam bolt attached to said guide plate, said cam bolt having a shank and a cam member, said cam member positioned at an end of said shank, said shank having a bore formed into said end thereof, forming a shoulder at an end of said bore; said cam member having a cam surface, said cam surface defining an upper seat and a lower seat; and
an indexing rod having a first end of said indexing rod located within said bore of said cam bolt, a pin being attached to said first end, and a camming pin extending laterally from said indexing rod, said camming pin being in sliding contact with said cam surface of said cam bolt, wherein said first end comprises a threaded bore axially formed partially into said first end, wherein the pin is separate from the indexing rod, and wherein the pin is coupled to the engaging rod via a bolt that engages with the threaded bore;
wherein said indexing rod is rotatable between a locked position in which said camming pin is received within said lower seat of said cam surface and an unlocked position in which said camming pin is received within said upper seat of said cam surface, said camming pin being slidable along said cam surface between said lower seat and said upper seat of said cam surface, wherein sliding of said camming pin between said lower seat and said upper seat causes said pin to engage and disengage from said indexing aperture of said support plate.

13. The locking assembly of claim 12, wherein when said camming pin is located in said lower seat of said cam surface, said pin is received within an indexing aperture formed through said support plate to prevent movement of said platform assembly relative to said guide assembly, and when said camming pin is located in said upper seat of said cam surface, said pin is withdrawn from said indexing aperture to allow movement of said platform assembly relative to said guide assembly.

14. The locking assembly of claim 12 further comprising a biasing member positioned within said bore of said cam bolt, said biasing member being in contact with said shoulder of said cam bolt and said pin to bias said pin into engagement with said indexing aperture as well as to bias said camming pin toward said lower seat of said cam surface.

15. The locking assembly of claim 14, wherein said biasing member is a compression spring.

16. The locking assembly of claim 12, wherein said cam surface is a helical surface extending between said upper and lower seats.

17. The locking assembly of claim 12, wherein said indexing rod being J-shaped.

* * * * *